(12) United States Patent
Yoshikawa et al.

(10) Patent No.: US 7,158,179 B2
(45) Date of Patent: Jan. 2, 2007

(54) OPTICAL DEVICE, OPTICAL DEVICE DRIVING UNIT, AND CAMERA SYSTEM

(75) Inventors: Kazumasa Yoshikawa, Utsunomiya (JP); Satoshi Natsume, Sagamihara (JP); Masayuki Sakamoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1173 days.

(21) Appl. No.: 09/819,757

(22) Filed: Mar. 29, 2001

(65) Prior Publication Data

US 2001/0040638 A1 Nov. 15, 2001

(30) Foreign Application Priority Data

Mar. 30, 2000 (JP) .............................. 2000-094957
Apr. 5, 2000 (JP) .............................. 2000-103487

(51) Int. Cl.
H04N 5/225 (2006.01)
H04N 5/262 (2006.01)
G03B 17/00 (2006.01)

(52) U.S. Cl. ................... 348/335; 348/240.99; 396/86
(58) Field of Classification Search ............ 348/240.3, 348/240.99; 396/86, 72, 103
See application file for complete search history.

(56) References Cited

U.S. PATENT DOCUMENTS 5,572,317 A * 11/1996 Parker et al. .......... 356/139.06
6,002,885 A * 12/1999 Kaneda ..................... 396/72
6,052,537 A * 4/2000 Sasaki ....................... 396/103
6,292,313 B1 * 9/2001 Kanayama et al. ........ 359/823
6,526,232 B1 * 2/2003 Mizumura .................. 396/86
6,633,729 B1 * 10/2003 Yoshikawa et al. ........ 396/86
6,721,012 B1 * 4/2004 Kawamura et al. ....... 348/335

FOREIGN PATENT DOCUMENTS

JP 51-40924 4/1976

OTHER PUBLICATIONS

U.S Appl. No. 09/824,655, filed Apr. 4, 2001.

* cited by examiner

Primary Examiner—David Ometz
Assistant Examiner—Luong T. Nguyen
(74) Attorney, Agent, or Firm—Fitzpatrick, Cella, Harper & Scinto

(57) ABSTRACT

Disclosed is an optical device including an optical member, a memory unit for storing preset driving information about driving of the optical member, a driving unit for driving the optical member, an operation unit having an operation member, and a control unit for performing drive control of the driving unit. The control unit changes the preset driving information in accordance with the operation of the operation unit.

9 Claims, 25 Drawing Sheets

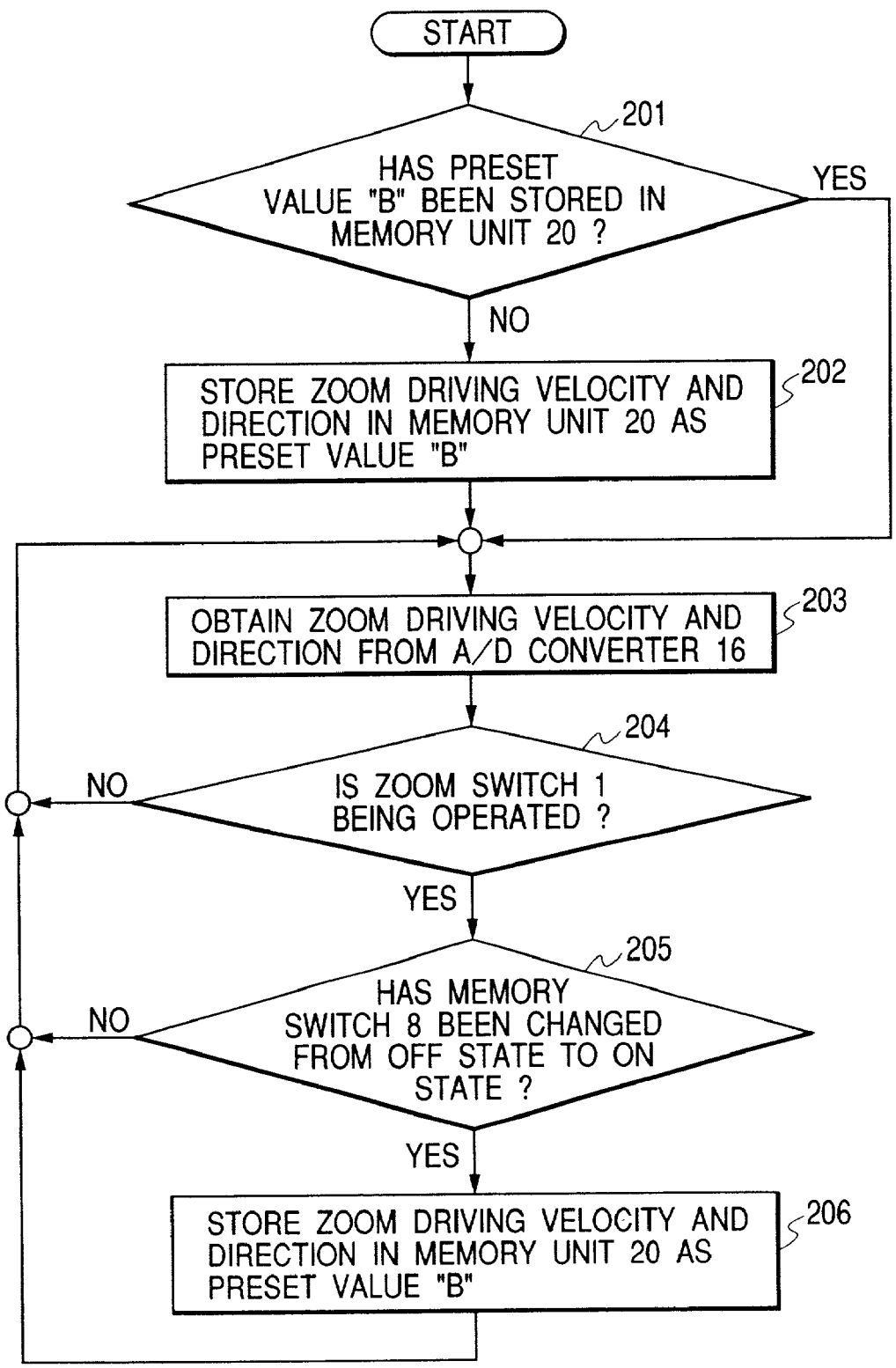

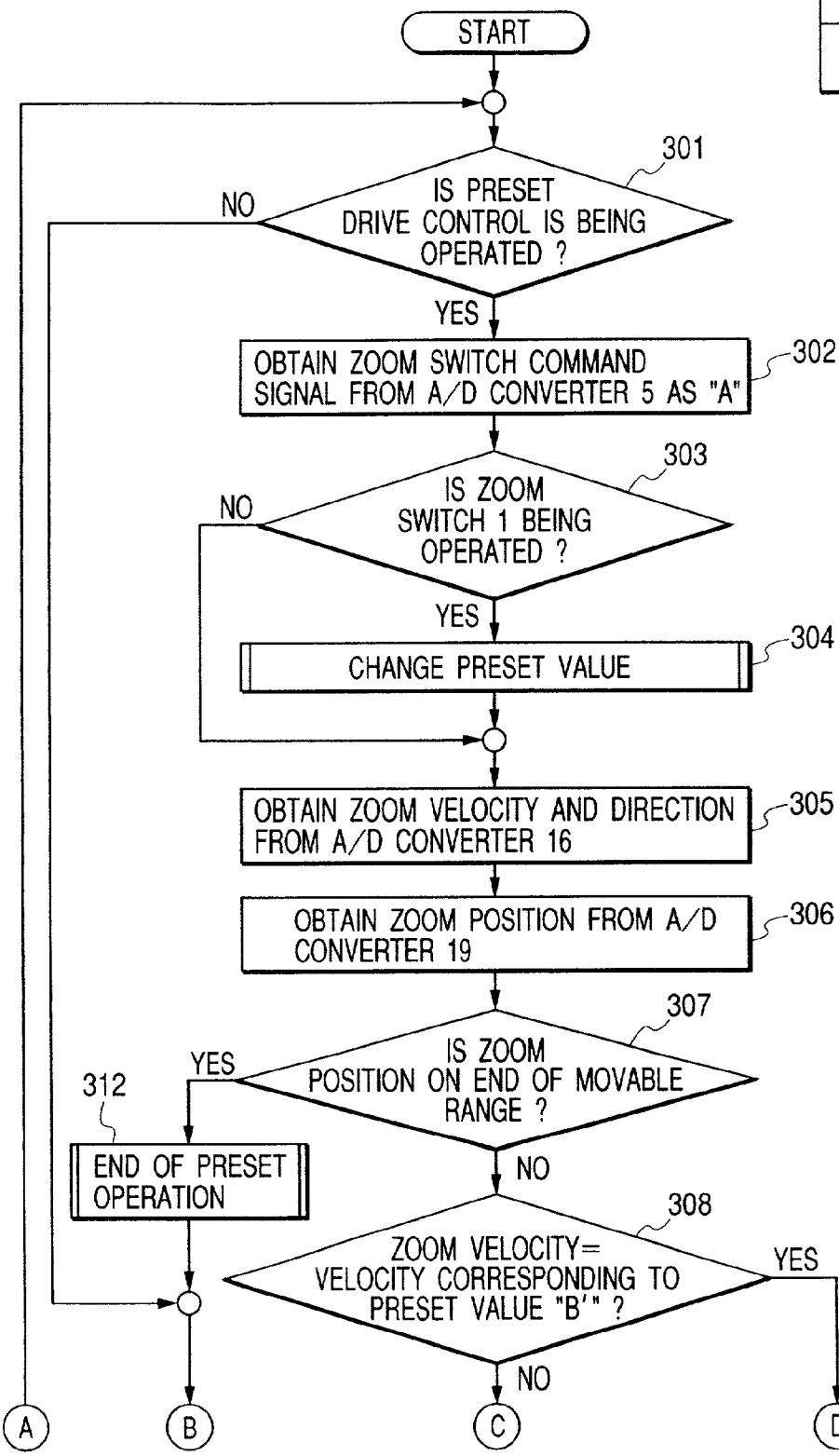
FIG. 5A
FIG. 5
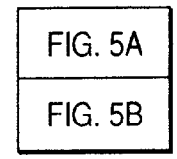

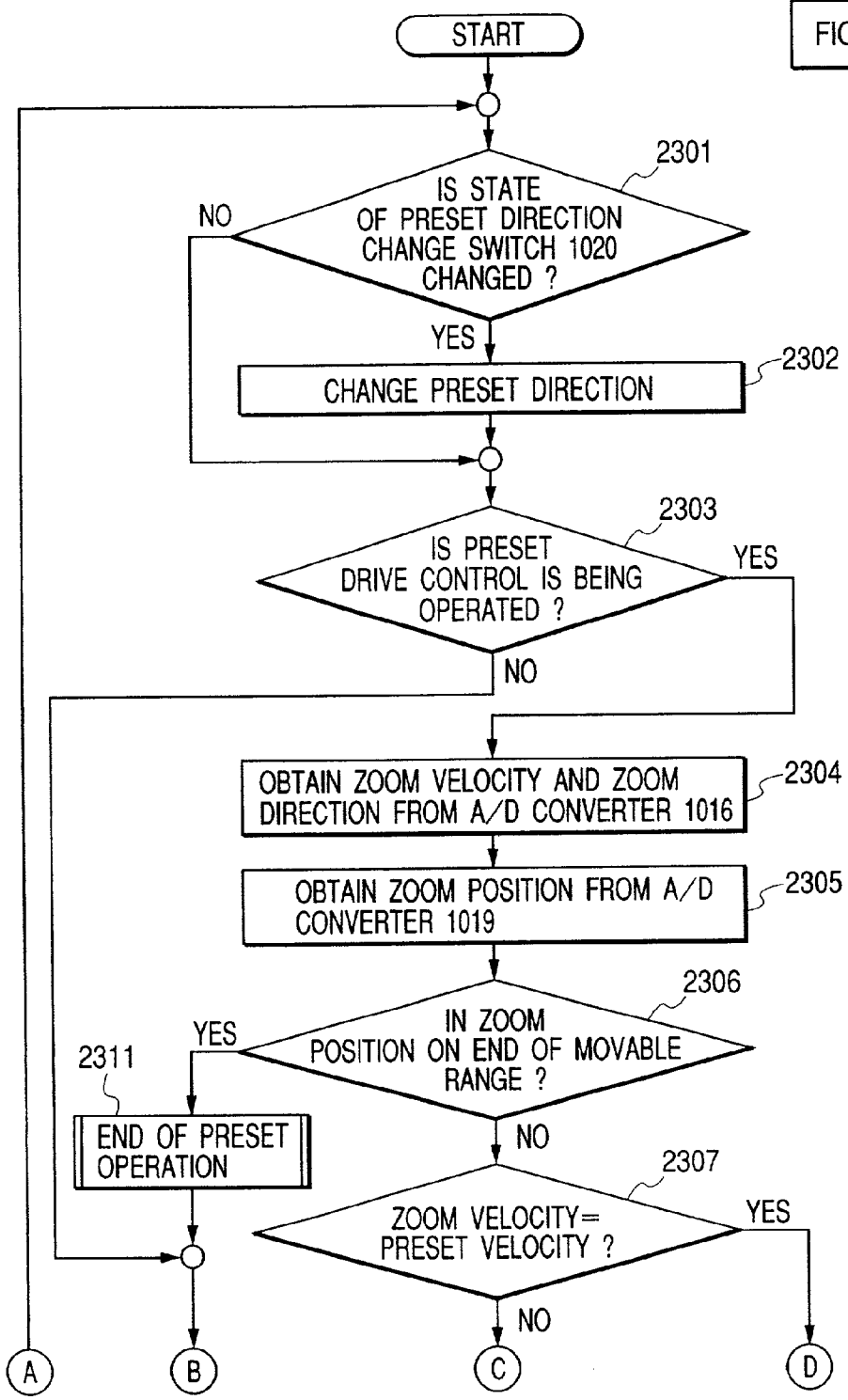

FIG. 20
| FIG. 20A |
|----------|
| FIG. 20B |
FIG. 20A
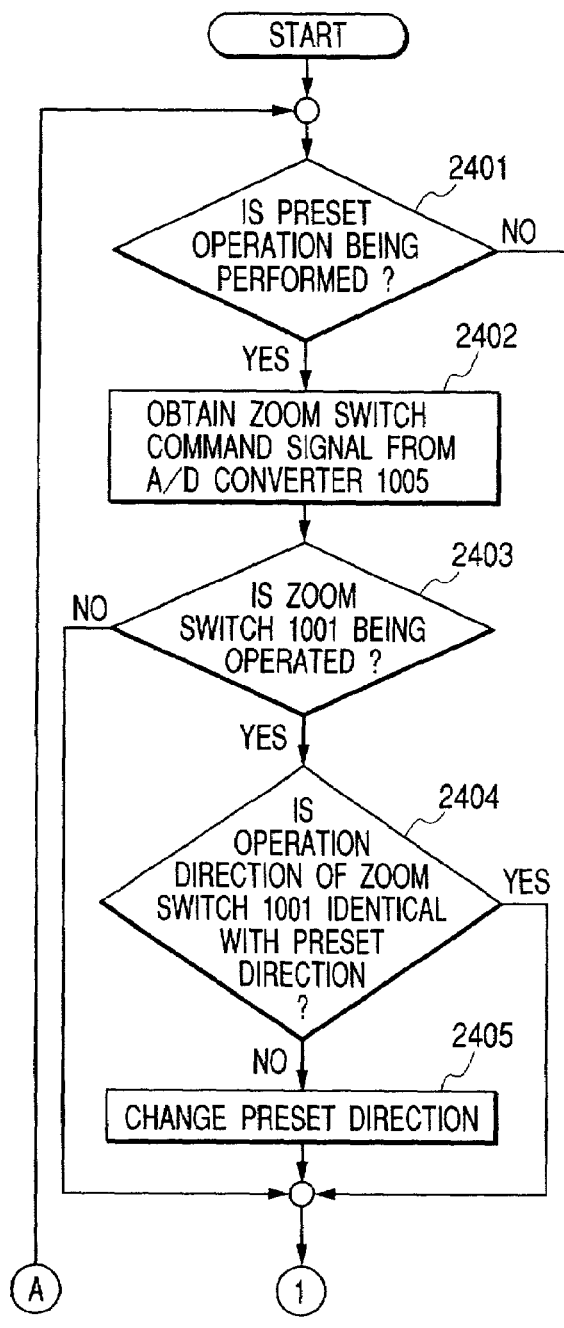
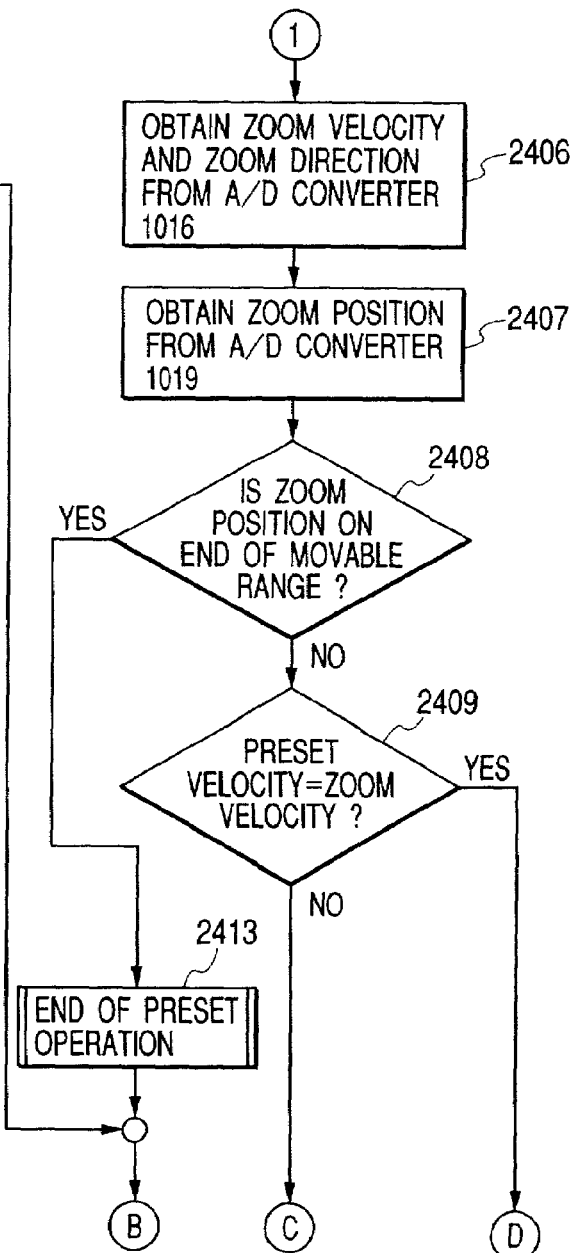

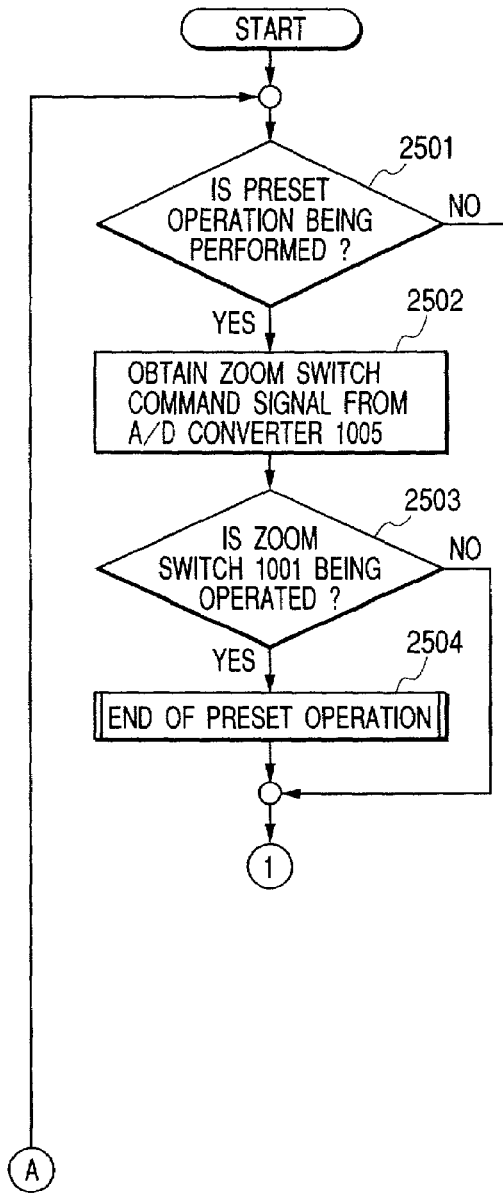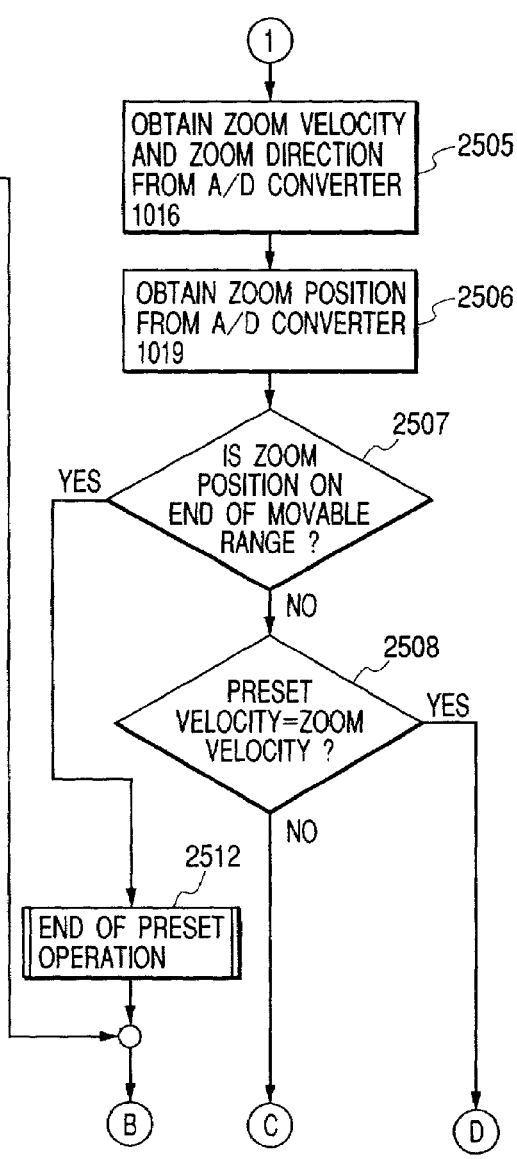
FIG. 21
FIG. 21A

OPTICAL DEVICE, OPTICAL DEVICE DRIVING UNIT, AND CAMERA SYSTEM

BACKGROUND OF THE INVENTION

1. Field of the Invention

The present invention relates to an optical device such as a zoom lens used in a TV camera, video camera, or the like.

2. Related Background Art

An optical device such as a TV lens or video lens comprises optical adjustment means such as a zoom lens optical system, focus lens optical system, and light quantity adjustment system. Most of optical devices can control the driving velocities of these optical adjustment means.

A zoom switch and zoom demand operated to designate driving of the optical adjustment means are disclosed in, e.g., Japanese Patent Application Laid-Open No. 51-40924. An optical device disclosed in this reference is equipped, for a zoom lens optical system such as a TV lens or video lens, with a servo means constituted by a driving system such as a motor and a control system for controlling the operation of the driving system. This optical device uses a zoom switch and zoom demand in order to supply a command signal to a control system in the servo means.

In actual zoom operation, the user can adjust the zoom velocity to a desired one from a low velocity to a high velocity in accordance with the operation amount of the zoom switch or the thumb ring of the zoom demand.

Image sensing using a TV camera or video camera adopts various image sensing methods, one of which is zooming at a constant velocity (e.g., low velocity). This constant-velocity zooming may be repeated many times during image sensing.

To easily execute constant-velocity zooming, there is an optical device having a function (to be referred to as a speed preset function hereinafter) of driving a zoom lens optical system at a pre-stored driving velocity toward a pre-stored driving direction.

More specifically, while the zoom lens optical system is driven at an arbitrary velocity, a storage designation operation means (memory switch or the like) is operated to store the driving velocity (and driving direction) at that time. Driving of the zoom lens optical system at a driving velocity (and direction) corresponding to the stored preset velocity information is executed in accordance with the operation of a preset drive start operation means (preset switch or the like).

This speed preset function can easily repeat constant-velocity zooming an arbitrary number of times. However, the driving velocity of the zoom lens optical system cannot be adjusted, particularly slightly adjusted during execution of the speed preset function.

A desired driving velocity can be obtained by stopping execution of the speed preset function (e.g., operating the preset drive start operation means again) and performing general zoom operation with a zoom switch or the like. This operation is cumbersome, and the changed velocity is difficult to maintain.

In addition, the preset function can easily repeat constant-velocity zooming an arbitrary number of times, but the zoom lens optical system can only be driven toward a predetermined direction stored in advance. It is, therefore, difficult to employ an image sensing method of driving the zoom lens optical system at a predetermined velocity (low velocity) toward the opposite direction during zooming at the same velocity using the speed preset function.

A desired driving direction can be set by stopping execution of the preset function (e.g., operating the preset drive start operation means again) and performing general zoom operation with the zoom switch or the like. This operation is cumbersome, and the start of reversing the driving direction delays.

SUMMARY OF THE INVENTION

It is an object of the present invention to change and set preset velocity information and change the driving velocity of a lens or any other optical member in accordance with the operation of a predetermined operation means during preset drive control in an optical device or optical device driving unit for performing preset drive control of driving the lens or optical member at a velocity corresponding to pre-stored preset velocity information.

It is another object of the present invention to change and set preset direction command information and change the driving direction of a lens or any other optical member in accordance with the operation of a predetermined operation means during preset drive control in an optical device or optical device driving unit for performing preset drive control of driving the lens or optical member toward a target driving direction of the optical member or a driving direction corresponding to preset direction command information stored in advance as information representing a target driving position.

To achieve the above objects, according to the present invention, there is provided an optical device comprising an optical member, memory means for storing preset velocity information about driving of the optical member, driving means for driving the optical member, operation means having an operation member, and control means for performing drive control of the driving means, wherein the control means performs preset drive control of the driving means on the basis of the preset velocity information stored in the memory means, and the control means changes the preset velocity information in accordance with an operation of the operation member.

According to the present invention, there is provided an optical device comprising an optical member, memory means for storing preset direction designation information representing a target driving direction or target driving position of the optical member, driving means for driving the optical member, operation means having an operation member, and control means for performing drive control of the driving means, wherein the control means performs preset drive control of the driving means on the basis of the preset direction designation information stored in the memory means, and the control means changes the preset direction designation information and a driving direction of the optical member in accordance with an operation of the operation member.

According to the present invention, there is provided an optical device comprising an optical member, memory means for storing preset driving information about driving of the optical member, driving means for driving the optical member, operation means having an operation member, and control means for performing drive control of the driving means, wherein the control means changes the preset driving information in accordance with an operation of the operation means.

The above and other objects, features, and advantages of the present invention will be apparent from the following description of embodiments in conjunction with the accompanying drawings.

BRIEF DESCRIPTION OF THE DRAWINGS

FIG. 4 is a flow chart showing processing when the preset velocity and preset direction in the lens device are set and stored;

DETAILED DESCRIPTION OF THE PREFERRED EMBODIMENTS (First Embodiment)

Figure 1:
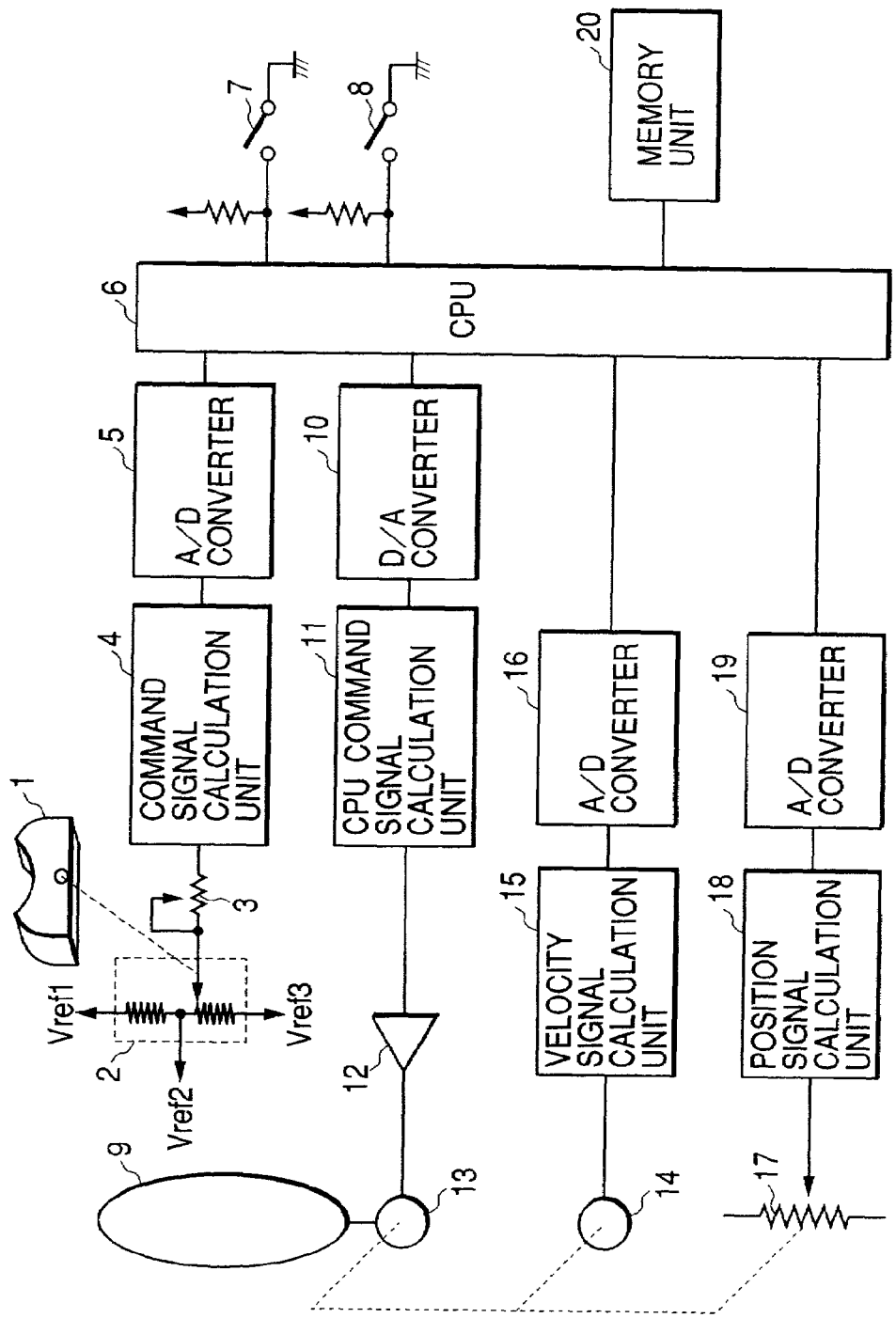
FIG. 1 is a block diagram showing the arrangement of the control circuit of a lens device according to the first embodiment of the present invention.
Figure 2:
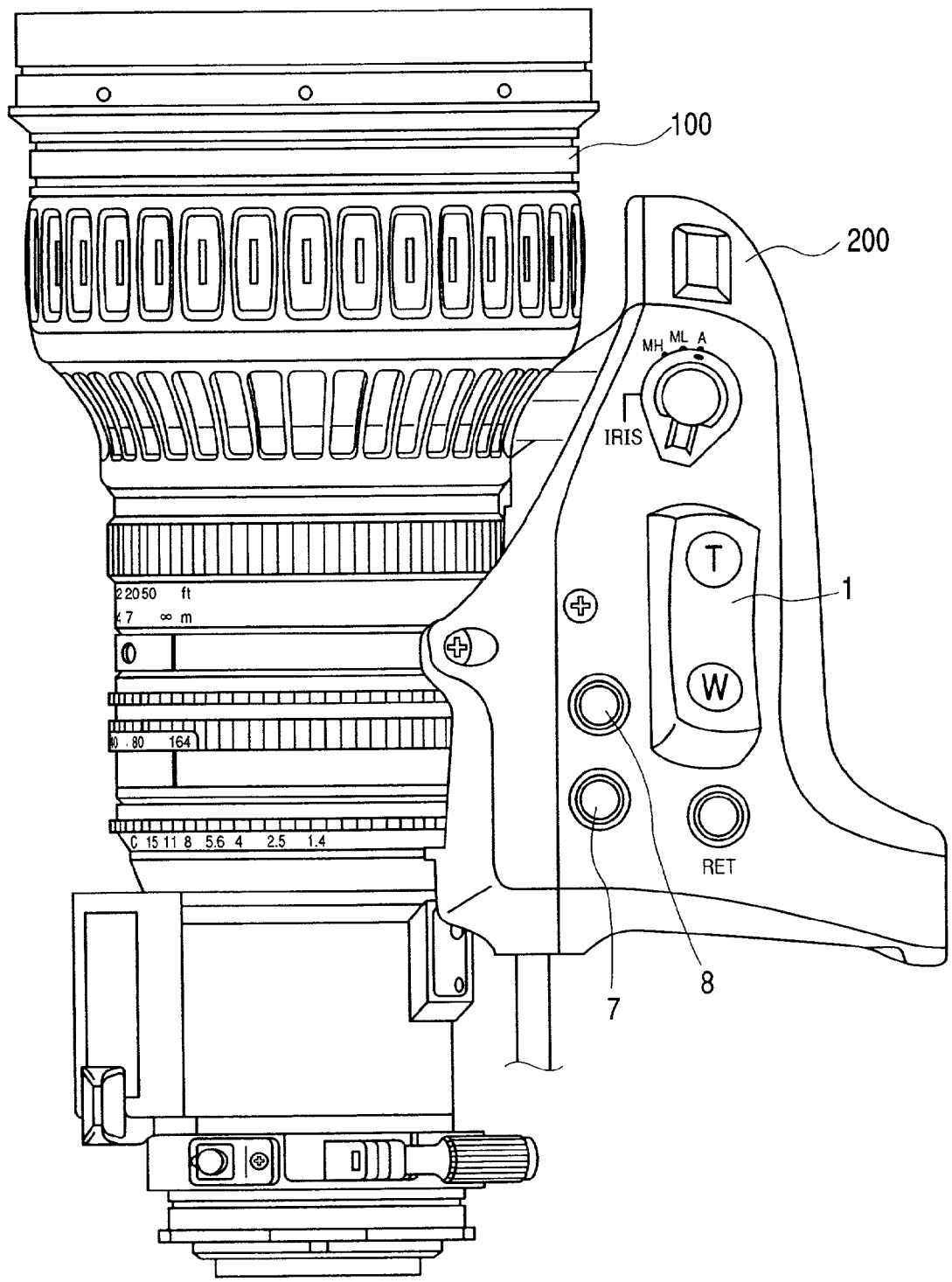
FIG. 2 is a plan view showing the outer appearance of the lens device.

FIG. 1 shows the arrangement of a lens device (optical device) according to the first embodiment of the present invention. FIG. 2 is a plan view showing the outer appearance of the upper part of the lens device.

In FIGS. 1 and 2, a zoom switch (predetermined operation means) 1 is operated by the user. A command signal generator 2 outputs a command signal for designating the driving direction and driving velocity (or driving amount and driving position) of a zoom lens optical system (optical adjustment means) 9 that are proportional to the operation amount of the zoom switch 1.

A zoom velocity variable volume control 3 changes the command signal level corresponding to the operation amount of the zoom switch 1. A command signal calculation unit 4 performs signal level shift conversion in order to supply a command signal to an A/D converter 5. The A/D converter 5 converts an analog signal output from the command signal calculation unit 4 to a digital signal. A CPU 6 controls preset drive control operation and other lens device operations.

A preset switch (preset drive start operation means) 7 is operated to designate the start and end of preset drive control operation. A memory switch (storage designation operation means) 8 designates storage of a preset direction and preset velocity.

The zoom lens optical system 9 adjusts the magnification of the lens device. A D/A converter 10 converts a command signal output from the CPU 6 and adapted to drive the zoom lens optical system 9, from a digital signal to an analog signal.

A CPU command signal calculation unit 11 performs signal level shift conversion of the command signal output from the D/A converter 10. A power amplifier 12 drives a motor 13 serving as a driving source for the zoom lens optical system 9.

A velocity detector 14 outputs a velocity signal corresponding to the driving velocity of the zoom lens optical system 9. A velocity signal calculation unit 15 performs signal level shift conversion in order to supply the output velocity signal to an A/D converter 16. The A/D converter 16 converts an analog signal output from the velocity signal calculation unit 15 to a digital signal.

A position detector 17 outputs a position signal corresponding to the position of the zoom lens optical system 9. A position signal calculation unit 18 performs signal level shift conversion in order to supply the position signal to an A/D converter 19. The A/D converter 19 converts an analog signal output from the position signal calculation unit 18 to a digital signal. A memory unit (memory means) 20 is represented by an EEPROM which stores a preset value.

In FIG. 2, a lens device main body 100 stores an optical adjustment means such as the zoom lens optical system 9 and a stop device (not shown). A driving unit 200 comprises the zoom switch 1, the preset switch 7, the memory switch 8, and a control circuit including the CPU 6 and motor 13, and is mounted on (or connected to) the lens device main body 100. An output from the motor 13 is transmitted to the zoom lens optical system 9 of the lens device main body 100 via a reduction gear (not shown) or the like. The lens device main body 100 is mounted on a camera (not shown) and constitutes a camera system.

In this arrangement, control in driving the zoom lens optical system 9 via the zoom switch 1 will be explained.

The command signal generator 2 outputs a zoom switch command signal for designating the driving direction and driving velocity of the zoom lens optical system 9 in correspondence with the operation (operation amount and operation direction) of the zoom switch 1. This zoom switch command signal is input to the CPU 6 via the zoom velocity variable volume control 3, command signal calculation unit 4, and A/D converter 5.

The CPU 6 obtains a CPU command signal in accordance with the zoom switch command signal and inputs it to the power amplifier 12 via the D/A converter 10 and CPU command signal calculation unit 11. The power amplifier 12 drives the motor 13 based on the input CPU command signal and drives the zoom lens optical system 9.

Figure 3:
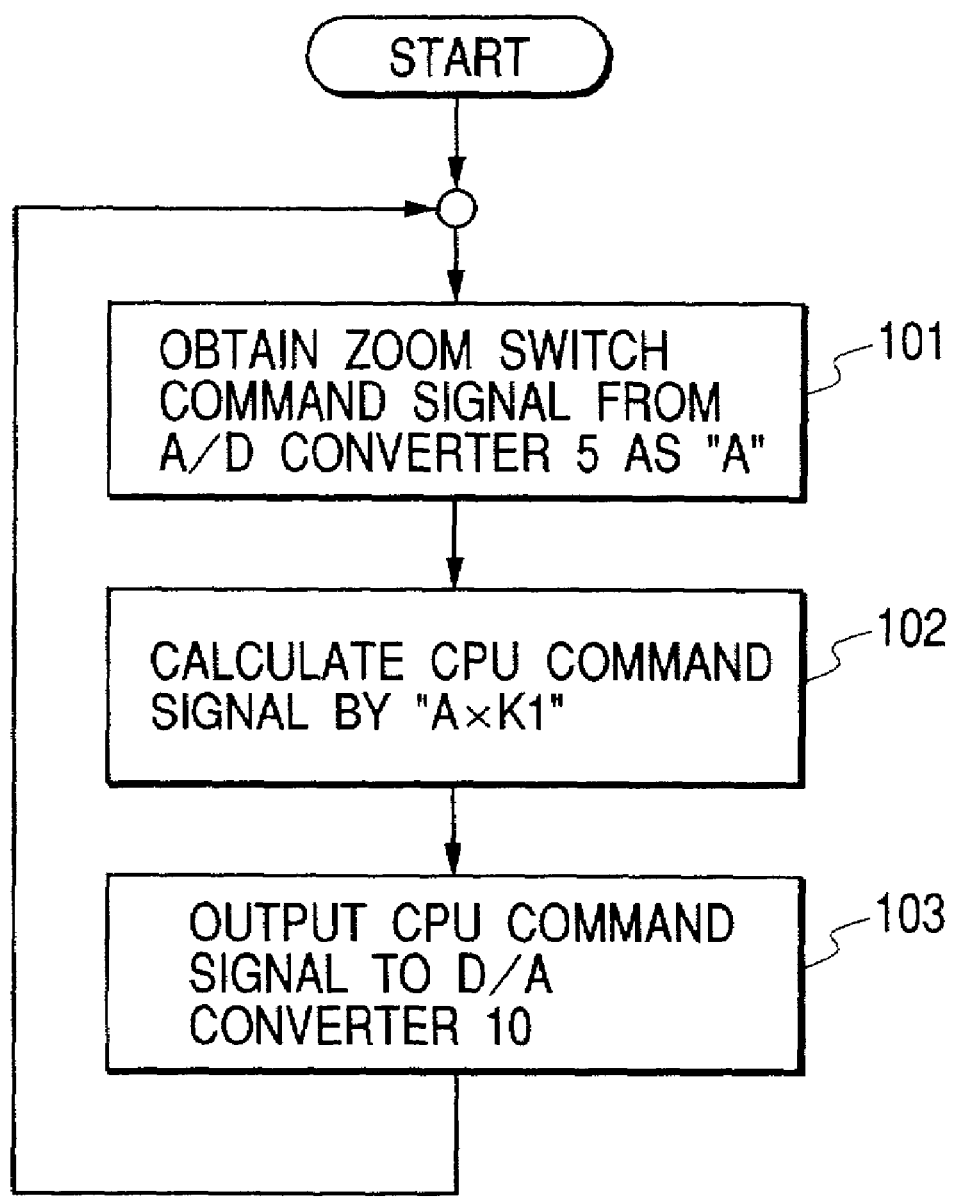
FIG. 3 is a flow chart showing processing when general driving of a zoom lens optical system is done with a zoom switch in the lens device.

Processing of the CPU 6 at this time will be described with reference to FIG. 3. The CPU 6 obtains a zoom switch command signal from the A/D converter 5 as "A" (step 101). The polarity of the zoom switch command signal "A", i.e., the driving direction of the zoom lens optical system 9 is represented by "positive/negative". Driving toward the telephoto direction is defined as "positive", and driving toward the wide-angle direction is as "negative".

The driving velocity is given by a numerical value. More specifically, the driving velocity is represented by "0" when the stop of the zoom lens optical system 9 as a state wherein the zoom switch 1 is not operated is designated. As the numerical value becomes larger from "1", the driving velocity of the zoom lens optical system 9 increases. The driving velocity is represented by "100" when the maximum velocity of the zoom lens optical system 9 drivable by the lens device is designated. A sign "+" is affixed to a numerical value of 1 to 100 for driving toward the telephoto direction, and a sign "−" is affixed for driving toward the wide-angle direction.

The zoom switch command signal "A" obtained in step 101 is multiplied by a constant K1, and the product is set as a CPU command signal (step 102). The CPU command signal is output to the D/A converter 10 (step 103). As a result, the zoom lens optical system 9 is driven by an amount proportional to the operation amount of the zoom switch 1 toward the driving direction corresponding to the operation direction.

Setting of a preset value (preset velocity information and preset direction information) representing a preset velocity and direction in the use of a preset drive control function, and preset drive control operation will be explained.

Setting of a preset value representing a preset velocity and direction will be described. A velocity signal from the velocity detector 14 that corresponds to the driving velocity of the zoom lens optical system 9 is input to the CPU 6 via the velocity signal calculation unit 15 and A/D converter 16. If the zoom switch 1 is operated, a zoom switch command signal proportional to the operation amount is input to the CPU 6, which can determine whether the zoom switch 1 is being operated.

The preset velocity is set when the user operates the zoom switch 1 and turns on the memory switch 8 from the OFF state while driving the zoom lens optical system 9 at a velocity toward a direction which the user wants to preset.

That is, a velocity signal (signal corresponding to the driving velocity and driving direction of the zoom lens optical system 9) from the velocity detector 14 when the memory switch 8 in the OFF state is turned on is obtained by the CPU 6 and stored as a preset value "B" in the memory unit 20.

Processing of the CPU 6 at this time will be explained with reference to FIG. 4. The CPU 6 determines whether the preset value "B" has been stored in the memory unit 20 as initial setting (step 201). If No in step 201, i.e., no preset value has been set, a preset value "B" representing a predetermined zoom driving velocity such as a maximum velocity and a predetermined zoom driving direction such as a telephoto direction or wide-angle direction is stored in the memory unit 20 (step 202).

The preset value "B" at initial setting may be a user-desired zoom driving velocity as a zoom driving velocity or a user-desired zoom driving direction as a zoom driving direction. The preset value "B" is represented by a numerical value having a polarity. The polarity is determined by the driving direction, i.e., positive for driving toward the telephoto direction and negative for driving toward the wide-angle direction. The value represents a driving velocity. The driving velocity is "0" when the stop of zoom driving is set as a preset value. As the value becomes larger from "1", the zoom driving velocity increases. The driving velocity is "100" when driving at the maximum velocity drivable by the lens device is set as a preset value.

After this processing, the CPU 6 obtains the driving velocity (to be referred to as a zoom velocity hereinafter) and driving direction (to be referred to as a zoom direction hereinafter) of the zoom lens optical system 9 from the A/D converter 16 (step 203). Then, the CPU 6 obtains data of the A/D converter 5 and determines whether the zoom switch 1 is being operated (step 204). If No in step 204, the CPU 6 obtains a zoom velocity and zoom direction from the A/D converter 16 again (step 203).

If Yes in step 204, the CPU 6 determines whether the memory switch 8 has been changed from the OFF state to the ON state (step 205). If No in step 205, the CPU 6 obtains a zoom velocity and zoom direction from the A/D converter 16 again (step 203). If Yes in step 205, the CPU 6 stores the zoom velocity and zoom direction obtained in step 203 in the memory unit 20 as a new preset value "B" (step 206).

Preset drive control operation will be described. Preset drive control operation basically starts when a CPU command signal (CPU command signal corresponding to the preset value "B") output from the CPU 6 upon the first ON operation of the preset switch 7 is input to the power amplifier 12 via the D/A converter 10 and CPU command signal calculation unit 11. After the start of preset drive control operation, driving of the zoom lens optical system 9 at a pre-stored preset velocity toward a pre-stored preset direction continues until the zoom lens optical system 9 reaches the end of its movable range in the lens device or the preset switch 7 is turned on again during driving.

In the first embodiment, if the zoom switch 1 is operated during preset drive control operation, the command signal generator 2 outputs a zoom switch control value (value of 1 to 100) to the CPU 6 via the zoom velocity variable volume control 3, command signal calculation unit 4, and A/D converter 5. Then, the CPU 6 increases/decreases a CPU command signal output to the D/A converter 10 in order to increase/decrease the preset velocity.

Processing of the CPU 6 at this time will be explained with reference to FIGS. 5A and 5B. The CPU 6 determines whether preset drive control is being operated (step 301). If No in step 301, the CPU 6 advances to step 315.

In step 315, the CPU 6 determines whether the preset switch 7 has been changed from the OFF state to the ON state. If No in step 315, the CPU 6 returns to step 301; or if Yes, determines whether preset drive control is being operated (step 316). If No in step 316, the CPU 6 starts preset drive control operation (step 317).

In preset drive control operation, the CPU 6 obtains the preset value "B" stored in the memory unit 20 in advance as "B"' (step 318), and drives the zoom lens optical system 9 at a zoom velocity toward a zoom direction that correspond to the preset value "B"'. Further, the CPU 6 obtains the preset value "B"' as a preset value B'old (to be described later).

If the CPU 6 determines that preset drive control is being operated in step 301 after the start of preset drive control operation, the CPU 6 obtains the zoom switch command signal "A" from the A/D converter 5 (step 302), and determines based on the value (0 to 100) of the zoom switch command signal "A" whether the zoom switch 1 is being operated (step 303).

If Yes in step 303 (zoom switch command signal "A" has a value of 1 to 100), the CPU 6 shifts to a preset velocity change subroutine (step 304), and advances to step 305. If No in step 303, the CPU 6 directly advances to step 305.

Figure 6:
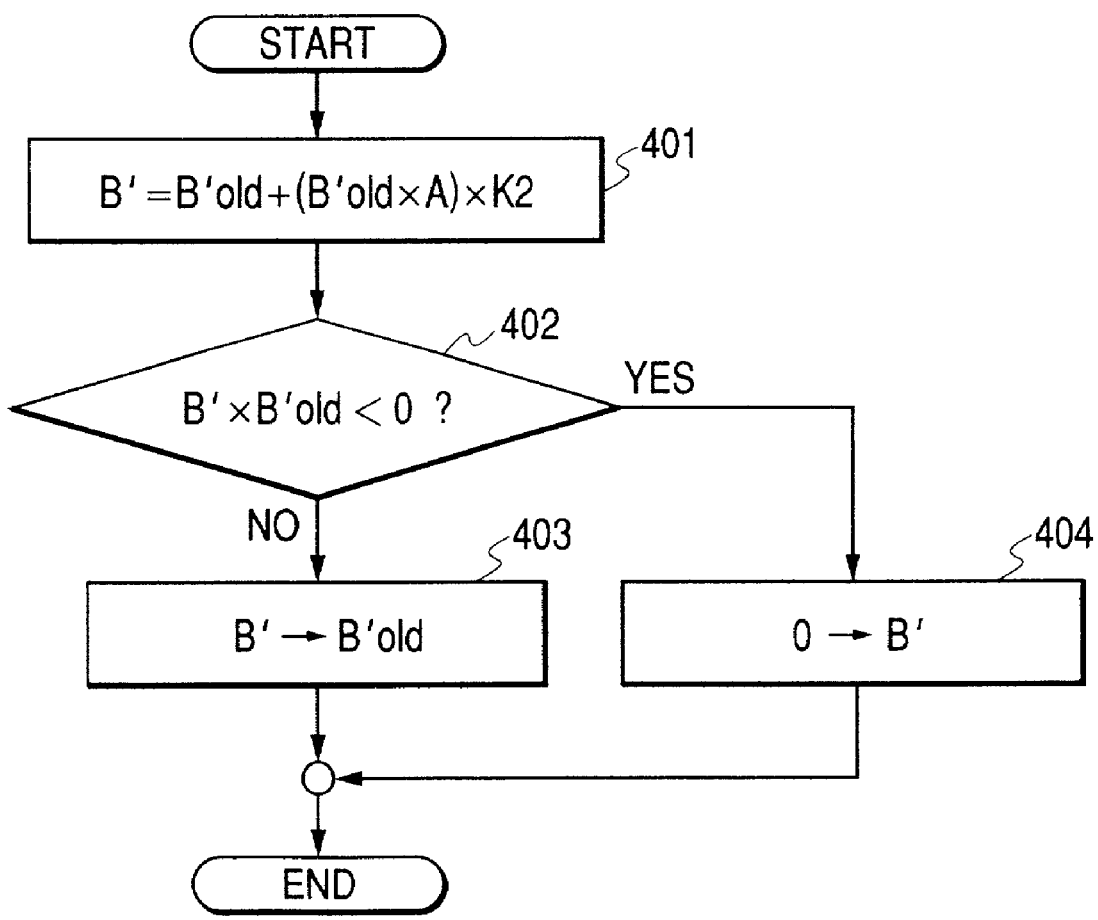
FIG. 6 is a flow chart showing processing of changing a preset value during preset drive control operation in the lens device.

The preset velocity change subroutine will be described with reference to FIG. 6. A new preset value "B'" is calculated using equation (1) in accordance with the value and polarity of the zoom switch command signal "A" input to the CPU 6 when the zoom switch 1 is operated during preset drive control operation (step 401):

$$B'=B'\text{old}+(B'\text{old}\times A)\times K2 \qquad (1)$$

where K2 is a constant, and B'old is a preset value obtained in step 318 at the start of preset drive control operation or a preset value set in previous execution of this subroutine. The preset value "B'" calculated by equation (1) is a value attained by changing, to a high- or low-velocity side, a preset value "B" set by general preset value setting operation, or a value attained by changing again, to a high- or low-velocity side, a preset value "B'" which has already been changed by this subroutine.

The CPU 6 multiplies the preset value "B'" calculated in step 401 by the preset value B'old before the change, and determines whether the product is a negative numerical value smaller than 0 (step 402).

If the product is a negative numerical value, the CPU 6 sets the preset value "B'" to 0 (stops driving of the zoom lens optical system 9) and holds this preset value "B'" in order to prevent the driving direction of the zoom lens optical system 9 from reversing as a result of changing the calculated preset value "B'" to the low-velocity side with respect to the preset value B'old before the change (step 404). If the product is not negative, the CPU 6 sets and holds the calculated preset value "B'" as a changed preset value "B'", and holds the calculated preset value "B'" as a preset value B'old (step 403).

By this preset value change subroutine, when the zoom switch 1 is operated toward the telephoto direction during preset drive control operation, the preset value can be changed to the high-velocity side by an amount proportional to the operation amount. When the zoom switch 1 is operated toward the wide-angle direction, the preset value can be changed to the low-velocity side by an amount proportional to the operation amount.

As is apparent from equation (1), the change amount of the preset value is the product of the operation amount of the zoom switch 1 and the preset value (B'old=B') at that time. The change amount of the preset value becomes larger for the same operation amount of the zoom switch 1 as the preset value B'old before the change is closer to the high-velocity side.

Figure 5B:
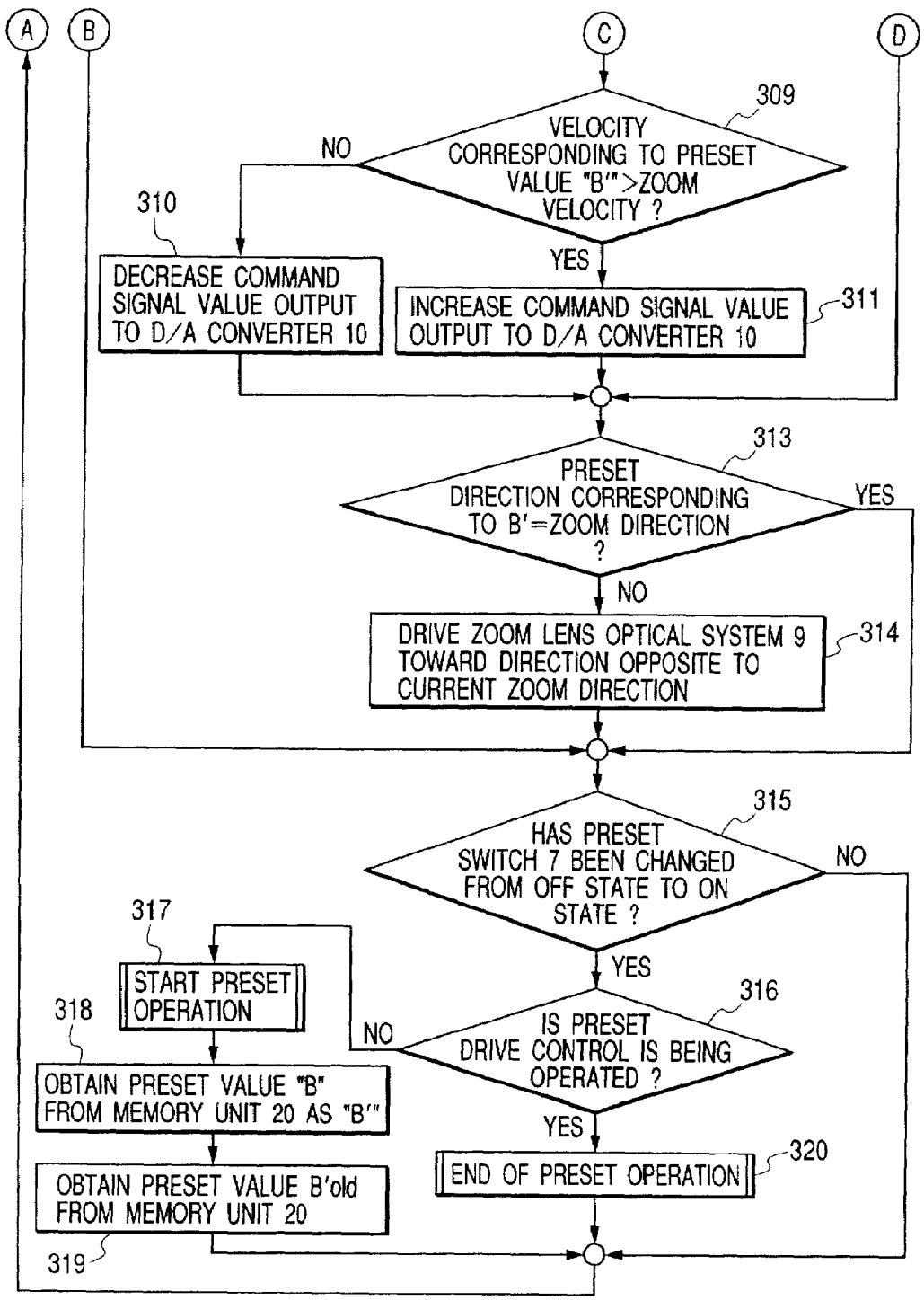
FIG. 5 is comprised of FIGS. 5A and 5B showing flow charts illustrating main processing in preset drive control operation in the lens device.

After the preset value change subroutine ends, the CPU 6 advances to step 305 in FIGS. 5A and 5B and obtains the current zoom velocity and zoom direction from the A/D converter 16. In step 306, the CPU 6 obtains the current position (to be referred to as a zoom position hereinafter) of the zoom lens optical system 9 from the A/D converter 19.

The CPU 6 determines whether the zoom position obtained in step 306 is on the end of the movable range of the lens device (step 307). If Yes in step 307, the CPU 6 ends preset drive control operation (step 312).

If No in step 307, the CPU 6 determines whether the zoom velocity obtained in step 305 is the velocity corresponding to the preset value "B'" set in step 304 (step 308).

If the zoom velocity during preset drive control is not the velocity corresponding to the preset value "B'", the CPU 6 determines whether the velocity corresponding to the preset value "B'" is higher than the zoom velocity (step 309). If the zoom velocity is lower (Yes in step 309), the CPU 6 increases the CPU command signal value output to the D/A converter 10, and increases the zoom velocity to the velocity corresponding to the preset value "B'" (step 311). If the zoom velocity during preset drive control is higher than the velocity corresponding to the preset value "B'" (No in step 309), the CPU 6 decreases the CPU command signal value output to the D/A converter 10, and decreases the zoom velocity to the velocity corresponding to the preset value "B'" (step 310).

The CPU 6 determines whether the zoom direction obtained in step 305 coincides with the preset direction represented by the preset value "B'" (step 313). If No in step 313, the CPU 6 drives the zoom lens optical system 9 toward a direction opposite to the current zoom direction (step 314), and advances to step 315. If Yes in step 313, the CPU 6 directly advances to step 315.

In step 315, the CPU 6 determines whether the preset switch 7 has been changed from the OFF state to the ON state. If No in step 315, the CPU 6 repeats steps 301 to 314 again. At this time, if the zoom switch 1 is operated again, the CPU 6 changes the preset value "B'" by the product of the operation amount and the preset value (B'old=B'), and changes the zoom velocity. If Yes in step 315 and the CPU 6 determines that preset drive control is being operated (Yes in step 316), the CPU 6 ends preset drive control operation (step 320).

In this manner, the first embodiment changes the preset value (velocity) in accordance with the operation of the zoom switch 1 in preset drive control operation of the zoom lens optical system 9. The first embodiment can implement a lens device capable of increasing/decreasing the zoom velocity in preset drive control operation.

In the first embodiment, the zoom driving velocity is increased when the zoom switch 1 is operated toward the telephoto direction regardless of the driving direction of the zoom lens optical system 9 during preset drive control operation, and decreased when the zoom switch 1 is operated toward the wide-angle direction. The relationship between the operation direction of the zoom switch and an increase/decrease in velocity may be reversed. In other words, when the zoom switch 1 is operated toward the wide-angle direction, the zoom driving velocity may be increased in proportion to the operation amount; and when the zoom switch 1 is operated toward the telephoto direction, the zoom driving velocity may be decreased in proportion to the operation amount. In this case, equation (1) in step 401 of FIG. 6 is rewritten to $$B'=B'\text{old}+(B'\text{old}\times(-A))\times K2$$

In the first embodiment, the CPU command signal in driving the zoom lens optical system 9 via the zoom switch 1 is attained by multiplying the zoom switch command signal by the constant K1. The zoom switch command signal itself may be used as a CPU command signal, or the CPU command signal may be obtained from table data on the basis of the zoom switch command signal.

The CPU command signal in increasing/decreasing the zoom driving velocity by the operation of the zoom switch 1 during preset drive control operation may be obtained from table data on the basis of the preset value and zoom switch command signal.

(Second Embodiment)

In the first embodiment, a preset value is stored in the memory unit 20 only when the user turns on the memory switch 8 from the OFF state before the start of preset drive control, and a changed preset value is deleted at the end of preset drive control (only the original preset value is stored and held in the memory unit 20). Alternatively, a preset value changed in accordance with the operation of the zoom switch 1 during preset drive control operation may be stored and held in the memory unit 20.

The second embodiment in which a changed preset value is stored and held in a memory unit 20 will be described. The second embodiment is the same as the first embodiment in the basic arrangement of a lens device, that the preset value is stored and set in accordance with the operation of a memory switch 8, and that the zoom driving velocity is increased/decreased depending on a preset value changed in accordance with the operation of a zoom switch 1 during preset drive control operation (main routine in FIGS. 5A and 5B). The second embodiment is different from the first embodiment in only the preset value change subroutine.

Figure 7:
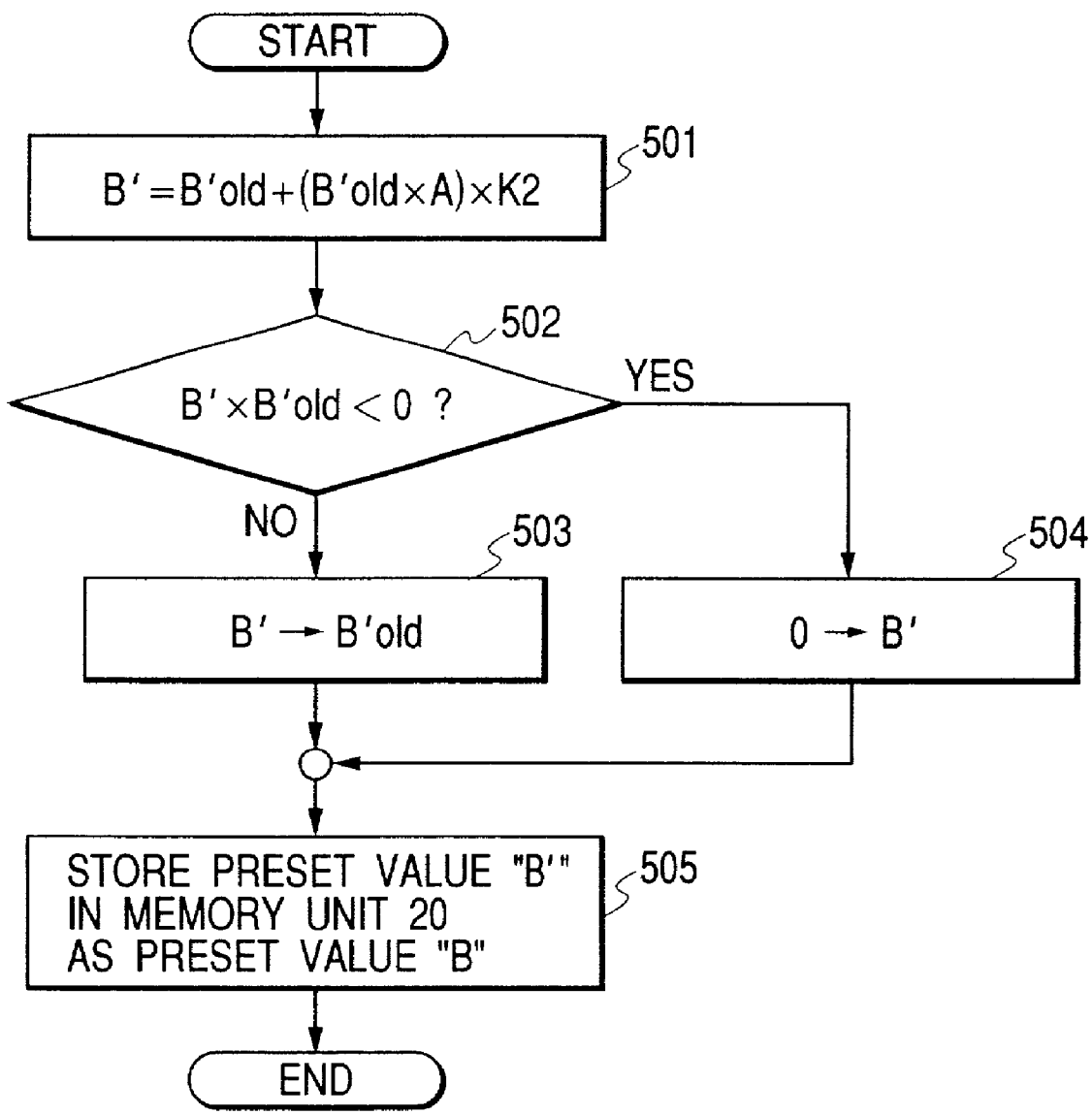
FIG. 7 is a flow chart showing processing of changing a preset value during preset drive control operation in a lens device according to the second embodiment of the present invention.

In the preset value change subroutine of the second embodiment shown in FIG. 7, a CPU 6 uses equation (2) to calculate a new preset value "B'" in accordance with the value and polarity of a zoom switch command signal "A" input to the CPU 6 when the zoom switch 1 is operated during preset drive control operation (step 501):

$$B'=B'\text{old}+(B'\text{old}\times A)\times K2 \qquad (2)$$

Note that equation (2) is the same as equation (1) in the first embodiment.

The CPU 6 multiplies the preset value "B'" calculated in step 501 by the preset value B'old before the change, and determines whether the product is negative (step 502).

If the product is negative, the CPU 6 sets the preset value "B'" to 0 (stops driving of a zoom lens optical system 9) and holds this preset value "B'" in order to prevent the driving direction of the zoom lens optical system 9 from reversing as a result of changing the calculated preset value "B'" to the low-velocity side with respect to the preset value B'old before the change (step 504). If the product is not negative, the CPU 6 sets and holds the calculated preset value "B'" as a changed preset value "B'", and holds the calculated preset value "B'" as a preset value B'old (step 503).

The CPU 6 stores the changed preset value "B'" in the memory unit 20 as a preset value "B" (step 505).

According to the second embodiment, similar to the first embodiment, when the zoom switch 1 is operated toward the telephoto direction during preset drive control operation, the zoom driving velocity can be increased by an amount proportional to the operation amount; and when the zoom switch 1 is operated toward the wide-angle direction, the zoom driving velocity can be decreased by an amount proportional to the operation amount.

Also similar to the first embodiment, the change amount of the preset value becomes larger for the same operation amount of the zoom switch 1 as the preset value B'old is closer to the high-velocity side.

According to the second embodiment, the preset value is stored and held in the memory unit 20 every time the preset value is changed during preset drive control operation. The finally changed preset value is stored and held in the memory unit 20, and can be used as a preset value at the start of the next preset drive control operation after the end of the current preset drive control operation. If the memory unit 20 is realized by a memory such as an EEPROM which holds the memory contents even after power-off operation, the finally changed preset value can be used as a preset value at the start of preset drive control operation from the next power-on operation.

In the second embodiment, the zoom driving velocity is increased when the zoom switch 1 is operated toward the telephoto direction regardless of the driving direction of the zoom lens optical system 9 during preset drive control operation, and decreased when the zoom switch 1 is operated toward the wide-angle direction. The relationship between the operation direction of the zoom switch and an increase/decrease in velocity may be reversed. That is, when the zoom switch 1 is operated toward the wide-angle direction, the zoom driving velocity may be increased in proportion to the operation amount; and when the zoom switch 1 is operated toward the telephoto direction, the zoom driving velocity may be decreased in proportion to the operation amount. In this case, equation (1) in step 501 of FIG. 7 is rewritten to $$B'=B'\text{old}+(B'\text{old}\times(-A))\times K2$$

(Third Embodiment)

In the first embodiment, when the zoom switch 1 is operated toward a predetermined one of the telephoto and wide-angle directions regardless of the zoom driving direction (preset direction) in preset drive control operation, the zoom driving velocity is increased in proportion to the operation amount; and when the zoom switch 1 is operated toward the other one of the telephoto and wide-angle directions, the zoom driving velocity is decreased in proportion to the operation amount. Alternatively, the relationship between the operation direction of the zoom switch 1 and an increase/decrease in velocity may be changed depending on the zoom driving direction in preset drive control operation.

The third embodiment in which the relationship between the operation direction of a zoom switch 1 and an increase/decrease in velocity is changed depending on the zoom driving direction in preset drive control operation will be described. The third embodiment is the same as the first embodiment in the basic arrangement of a lens device, that the preset value is stored and set in accordance with the operation of a memory switch 8, and that the zoom driving velocity is increased/decreased depending on a preset value changed in accordance with the operation of the zoom switch 1 during preset drive control operation (main routine in FIGS. 5A and 5B). The third embodiment is different from the first embodiment in only the preset value change subroutine.

Figure 8:
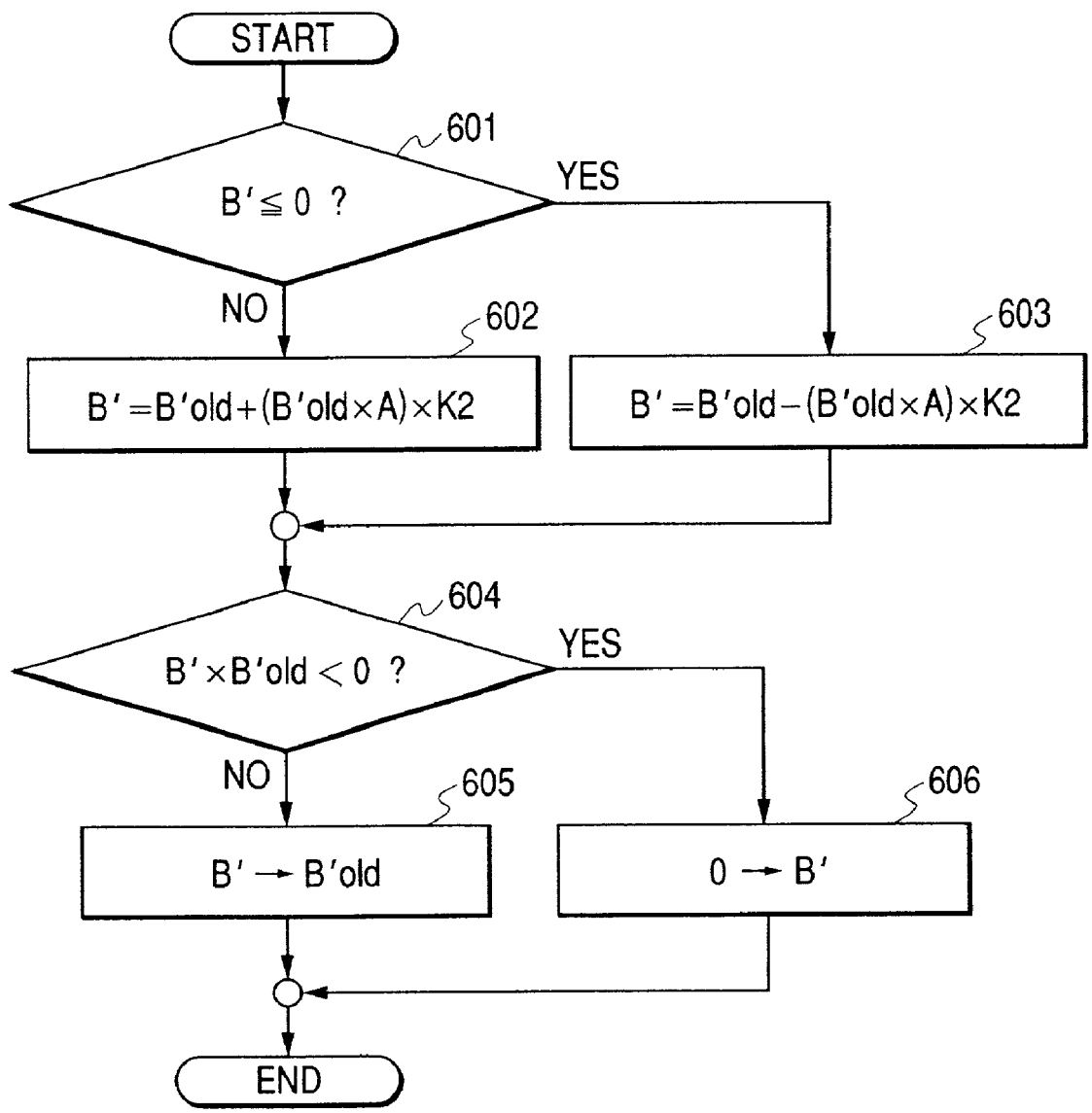
FIG. 8 is a flow chart showing processing of changing a preset value during preset drive control operation in a lens device according to the third embodiment of the present invention.

In the preset value change subroutine of the third embodiment shown in FIG. 8, a CPU 6 determines whether a preset value "B'" is negative, i.e., whether the zoom driving direction (preset direction) is the telephoto or wide-angle direction (step 601). If the preset value "B'" is not negative (telephoto direction), the CPU 6 uses equation (3) to calculate a new preset value "B'" in accordance with the value and polarity of a zoom switch command signal "A" input to the CPU 6 when the zoom switch 1 is operated during preset drive control operation (step 602):

$$B'=B'\text{old}+(B'\text{old}\times A)\times K2 \qquad (3)$$

where K2 is a constant, and B'old is a preset value obtained in step 318 of FIGS. 5A and 5B at the start of preset drive control operation or a preset value set in previous execution of this subroutine. The preset value "B'" calculated by equation (3) is a value attained by changing, to the high- or low-velocity side, a preset value "B" set by general preset value setting operation, or a value attained by changing again, to the high- or low-velocity side, a preset value "B'" which has already been changed by this subroutine.

In this case, when the zoom switch 1 is operated toward the telephoto direction (operation direction corresponding to the zoom driving direction), the polarity of the zoom switch command signal "A" is positive, and the preset value "B'" is changed to the high-velocity side with respect to B'old. When the zoom switch 1 is operated toward the wide-angle direction (operation direction opposite to the operation direction corresponding to the zoom driving direction), the polarity of the zoom switch command signal "A" is negative, and the preset value "B'" is changed to the low-velocity side with respect to B'old.

If the preset value "B'" is negative (wide-angle direction) in step 601, the CPU 6 uses equation (4) to calculate a new preset value "B'" in accordance with the value and polarity of the zoom switch command signal "A" input to the CPU 6 when the zoom switch 1 is operated during preset drive control operation (step 603):

$$B'=B'\text{old}-(B'\text{old}\times A)\times K2 \qquad (4)$$

where K2 is a constant.

In this case, when the zoom switch 1 is operated toward the wide-angle direction (operation direction corresponding to the zoom driving direction), the polarity of the zoom switch command signal "A" is negative, and the preset value "B'" is changed to the high-velocity side with respect to B'old. When the zoom switch 1 is operated toward the telephoto direction (operation direction opposite to the operation direction corresponding to the zoom driving direction), the polarity of the zoom switch command signal "A" is positive, and the preset value "B'" is changed to the low-velocity side with respect to B'old.

The CPU 6 multiplies the preset value "B'" calculated in step 602 or 603 by the preset value B'old before the change, and determines whether the product is negative (step 604).

If the product is negative, the CPU 6 sets the preset value "B'" to 0 (stops driving of a zoom lens optical system 9) and holds this preset value "B'" in order to prevent the driving direction of the zoom lens optical system 9 from reversing as a result of changing the calculated preset value "B'" to the low-velocity side with respect to the preset value B'old before the change (step 606). If the product is not negative, the CPU 6 sets and holds the calculated preset value "B'" as a changed preset value "B'", and holds the calculated preset value "B'" as a preset value B'old (step 605).

According to the third embodiment, when the zoom driving direction in preset drive control operation is the telephoto direction and the zoom switch 1 is operated toward the telephoto direction, the zoom driving velocity can be increased by an amount proportional to the operation amount. When the zoom switch 1 is operated toward the wide-angle direction, the zoom driving velocity can be decreased by an amount proportional to the operation amount.

To the contrary, when the zoom driving direction in preset drive control operation is the wide-angle direction and the zoom switch 1 is operated toward the wide-angle direction, the zoom driving velocity can be increased by an amount proportional to the operation amount. When the zoom switch 1 is operated toward the telephoto direction, the zoom driving velocity can be decreased by an amount proportional to the operation amount.

Similar to the first embodiment, the change amount of the preset value becomes larger for the same operation amount of the zoom switch 1 as the preset value B'old is closer to the high-velocity side.

According to the third embodiment, the zoom driving velocity is increased when the zoom switch 1 is operated toward the operation direction corresponding to the zoom driving direction during preset drive control operation, and decreased when the zoom switch 1 is operated toward the opposite direction. The relationship between the operation direction of the zoom switch and an increase/decrease in velocity may be reversed. That is, when the zoom switch 1 is operated toward a direction opposite to the direction corresponding to the zoom driving direction, the zoom driving velocity may be increased in proportion to the operation amount; and when the zoom switch 1 is operated toward the direction corresponding to the zoom driving direction, the zoom driving velocity may be decreased in proportion to the operation amount. In this case, equation (3) in step 602 of FIG. 8 is rewritten to $$B'=B'\text{old}+(B'\text{old}\times(-A))\times K2$$

and equation (4) in step 603 is rewritten to $$B'=B'\text{old}-(B'\text{old}\times(-A))\times K2$$

(Fourth Embodiment)

In the third embodiment, a preset value is stored in the memory unit 20 only when the user turns on the memory switch 8 from the OFF state before the start of preset drive control, and a changed preset value is deleted at the end of preset drive control (only the original preset value is stored and held in the memory unit 20). Alternatively, a preset value changed in accordance with the operation of the zoom switch 1 during preset drive control operation may be stored and held in the memory unit 20.

The fourth embodiment in which a changed preset value is stored and held in a memory unit 20 will be described. The fourth embodiment is the same as the third (first) embodiment in the basic arrangement of a lens device, that the preset value is stored and set in accordance with the operation of a memory switch 8, and that the zoom driving velocity is increased/decreased depending on a preset value changed in accordance with the operation of a zoom switch 1 during preset drive control operation (main routine in FIGS. 5A and 5B). The fourth embodiment is different from the third embodiment in only the preset value change subroutine.

An operation via the zoom switch 1 and setting of the preset value using the memory switch 8 are the same as those in the first embodiment, and a description thereof will be omitted. Preset operation is also the same as that in the first embodiment except for setting of the preset value, so that only setting of the preset value will be described.

Figure 9:
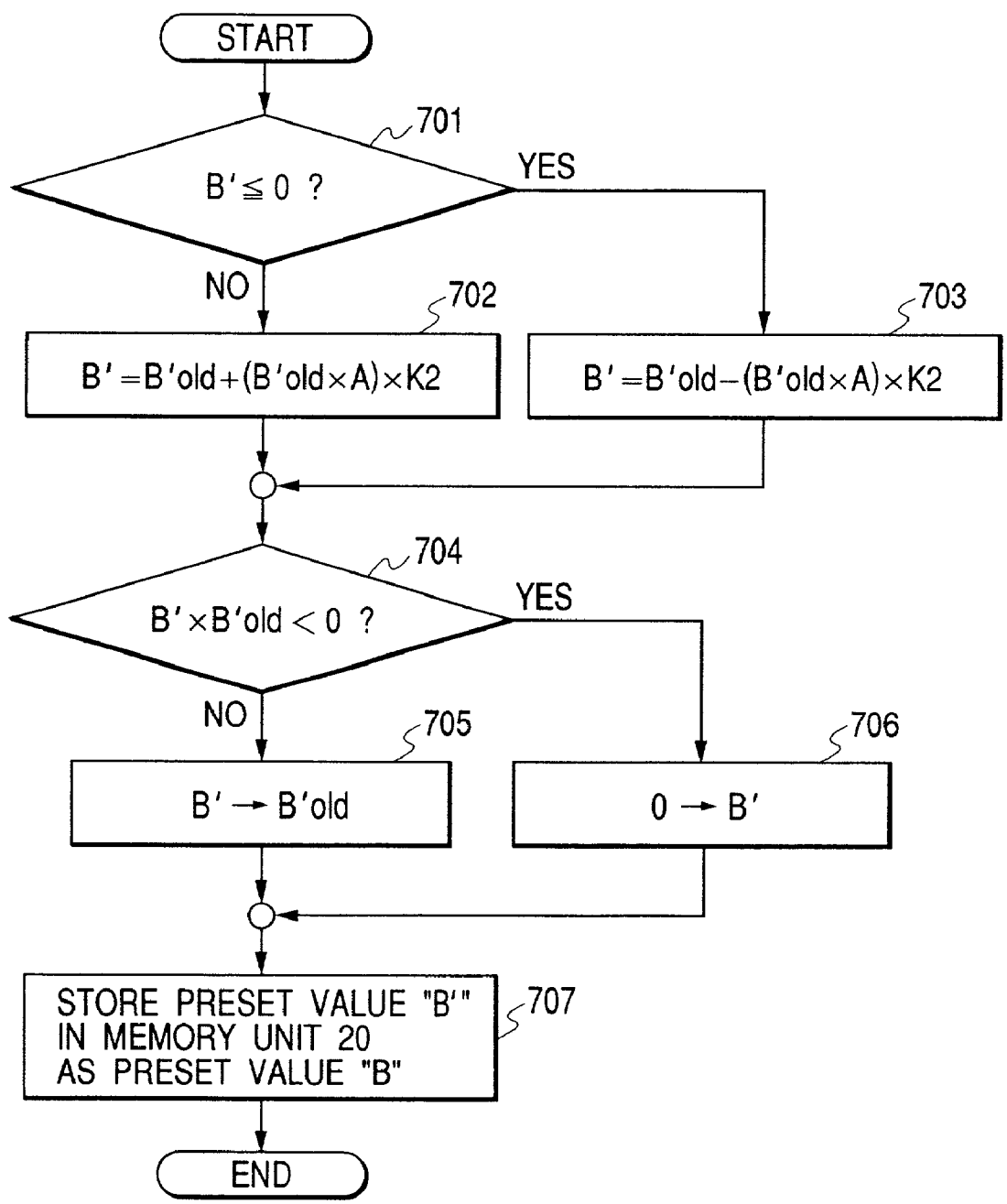
FIG. 9 is a flow chart showing processing of changing a preset value during preset drive control operation in a lens device according to the fourth embodiment of the present invention.

In the preset value change subroutine of the fourth embodiment shown in FIG. 9, a CPU 6 determines whether a preset value "B'" is negative, i.e., whether the zoom driving direction is the telephoto or wide-angle direction (step 701). If the preset value "B'" is not negative (telephoto direction), the CPU 6 uses equation (5) to calculate a new preset value "B'" in accordance with the value and polarity of a zoom switch command signal "A" input to the CPU 6 when the zoom switch 1 is operated during preset drive control operation (step 702):

$$B'=B'\text{old}+(B'\text{old}\times A)\times K2 \quad (5)$$

Note that equation (5) is the same as equation (3) in the third embodiment.

If the preset value "B'" is negative (wide-angle direction) in step 701, the CPU 6 uses equation (6) to calculate a new preset value "B'" in accordance with the value and polarity of the zoom switch command signal "A" input to the CPU 6 when the zoom switch 1 is operated during preset drive control operation (step 703):

$$B'=B'\text{old}-(B'\text{old}\times A)\times K2 \quad (6)$$

Note that equation (6) is the same as equation (4) in the third embodiment.

The CPU 6 multiplies the preset value "B'" calculated in step 702 or 703 by the preset value B'old before the change, and determines whether the product is negative (step 704).

If the product is negative, the CPU 6 sets the preset value "B'" to 0 (stops driving of a zoom lens optical system 9) and holds this preset value "B'" in order to prevent the driving direction of the zoom lens optical system 9 from reversing as a result of changing the calculated preset value "B'" to the low-velocity side with respect to the preset value B'old before the change (step 706). If the product is not negative, the CPU 6 sets and holds the calculated preset value "B'" as a changed preset value "B'", and holds the calculated preset value "B'" as a preset value B'old (step 705).

The CPU 6 stores the held preset value "B'" in the memory unit 20 as a preset value "B" (step 707).

According to the fourth embodiment, similar to the third embodiment, when the zoom driving direction in preset drive control operation is the telephoto direction and the zoom switch 1 is operated toward the telephoto direction, the zoom driving velocity can be increased by an amount proportional to the operation amount. When the zoom switch 1 is operated toward the wide-angle direction, the zoom driving velocity can be decreased by an amount proportional to the operation amount.

To the contrary, when the zoom driving direction in preset drive control operation is the wide-angle direction and the zoom switch 1 is operated toward the wide-angle direction, the zoom driving velocity can be increased by an amount proportional to the operation amount. When the zoom switch 1 is operated toward the telephoto direction, the zoom driving velocity can be decreased by an amount proportional to the operation amount.

Also similar to the third embodiment, the change amount of the preset value becomes larger for the same operation amount of the zoom switch 1 as the preset value B'old is closer to the high-velocity side.

According to the fourth embodiment, the preset value is stored and held in the memory unit 20 every time the preset value is changed during preset drive control operation. The finally changed preset value is stored and held in the memory unit 20, and can be used as a preset value at the start of the next preset drive control operation after the end of the current preset drive control operation. If the memory unit 20 is realized by a memory such as an EEPROM which holds the memory contents even after power-off operation, the finally changed preset value can be used as a preset value at the start of preset drive control operation from the next power-on operation.

According to the fourth embodiment, the zoom driving velocity is increased when the zoom switch 1 is operated toward the operation direction corresponding to the zoom driving direction during preset drive control operation, and decreased when the zoom switch 1 is operated toward the opposite direction. The relationship between the operation direction of the zoom switch and an increase/decrease in velocity may be reversed. That is, when the zoom switch 1 is operated toward a direction opposite to the direction corresponding to the zoom driving direction, the zoom driving velocity may be increased in proportion to the operation amount; and when the zoom switch 1 is operated toward the direction corresponding to the zoom driving direction, the zoom driving velocity may be decreased in proportion to the operation amount. In this case, equation (5) in step 702 of FIG. 9 is rewritten to $$B'=B'\text{old}+(B'\text{old}\times(-A))\times K2$$

and equation (6) in step 703 is rewritten to $$B'=B'\text{old}-(B'\text{old}\times(-A))\times K2$$

(Fifth Embodiment)

In the first to fourth embodiments, the preset value is changed (zoom driving velocity is increased/decreased) in proportion to the operation amount of the zoom switch 1 during preset drive control operation. It may also be possible that the zoom switch 1 is operated as an ON/OFF switch during preset drive control operation, that a predetermined value is added to the preset value in accordance with the number of operations of the zoom switch 1, i.e., the number of operations toward the telephoto direction, and that a predetermined value is subtracted from the preset value in accordance with the number of operations toward the wide-angle direction. The "predetermined value" is, e.g., a fixed value or a value set in advance such as 10% of the preset value.

The fifth embodiment in which the zoom driving velocity is increased/decreased in accordance with the number of operations of a zoom switch 1 will be explained. The fifth embodiment is the same as each of the above embodiments in the basic arrangement of a lens device, that the preset value is stored and set in accordance with the operation of a memory switch 8, and that the zoom driving velocity is increased/decreased depending on a preset value changed in accordance with the operation of the zoom switch 1 during preset drive control operation (except for steps 303 and 304 in the main routine of FIGS. 5A and 5B). The fifth embodiment replaces steps 303 and 304 in the main routine by steps shown in FIG. 10.

A CPU 6 shifts from step 302 in FIGS. 5A and 5B to step 801, and determines whether the zoom switch 1 is being operated. If No in step 801, the CPU 6 clears a TELE switch flag (step 812), clears a WIDE switch flag (step 813), and advances to step 305 in FIGS. 5A and 5B.

If Yes in step 801, the CPU 6 determines whether the zoom switch 1 is being operated toward the telephoto direction (step 802). If Yes in step 802, the CPU 6 checks whether the TELE switch flag is set (step 803). If Yes in step 803, the CPU 6 shifts to step 809; or if No, uses equation (7) to calculate a new preset value "B'" corresponding to one operation of the zoom switch 1 toward the telephoto direction during preset drive control operation (step 804):

$$B'=B'\text{old}+(B'\text{old}\times K2) \tag{7}$$

where K2 is a constant. After that, the CPU 6 sets the TELE switch flag (step 805).

From step 804, if the zoom switch 1 is operated once toward the telephoto direction, the preset value "B'" is changed to the high-velocity side with respect to B'old regardless of the operation amount (value of the zoom switch command signal "A").

If No in step 802, the CPU 6 checks whether the WIDE switch flag is set (step 806). If Yes in step 806, the CPU 6 advances to step 809; or if No, uses equation (8) to calculate a new preset value "B'" corresponding to one operation of the zoom switch 1 toward the wide-angle direction during preset drive control operation (step 807):

$$B'=B'\text{old}-(B'\text{old}\times K2) \tag{8}$$

where K2 is a constant. The CPU 6 sets the WIDE switch flag (step 808).

From step 807, if the zoom switch 1 is operated once toward the wide-angle direction, the preset value "B'" is changed to the low-velocity side with respect to B'old regardless of the operation amount (value of the zoom switch command signal "A").

Note that B'old is a preset value obtained in step 318 of FIGS. 5A and 5B at the start of preset drive control operation or a preset value changed in the previous routine. That is, the preset value "B'" calculated by equation (7) or (8) is a value attained by changing, to the high- or low-velocity side, a preset value "B" set by general preset value setting operation, or a value attained by changing again, to the high- or low-velocity side, a preset value "B'" which has already been changed.

The CPU 6 multiplies the preset value "B'" calculated in step 804 or 807 by the preset value B'old before the change, and determines whether the product is negative (step 809).

If the product is negative, the CPU 6 sets the preset value "B'" to 0 (stops driving of a zoom lens optical system 9) and holds this preset value "B'" in order to prevent the driving direction of the zoom lens optical system 9 from reversing as a result of changing the calculated preset value "B'" to the low-velocity side with respect to the preset value B'old before the change (step 811). If the product is not negative, the CPU 6 sets and holds the calculated preset value "B'" as a changed preset value "B'", and holds the calculated preset value "B'" as a preset value B'old (step 810). Then, the CPU 6 shifts from step 810 or 811 to step 305 in FIGS. 5A and 5B.

According to the fifth embodiment, when the zoom switch 1 is operated once toward the telephoto direction during preset drive control operation, the zoom driving velocity can be increased by an amount proportional to the zoom driving velocity (preset value B'old) at that time. When the zoom switch 1 is operated once toward the wide-angle direction, the zoom driving velocity can be decreased by an amount proportional to the zoom driving velocity (preset value B'old) at that time.

The main routine including steps 801 to 811 is repetitively executed during preset drive control operation. If the zoom switch 1 is operated toward the telephoto direction a plurality of number of times during the main routine, the zoom driving velocity is gradually increased every operation. If the zoom switch 1 is operated toward the wide-angle direction a plurality of number of times, the zoom driving velocity is gradually decreased every operation.

Figure 10:
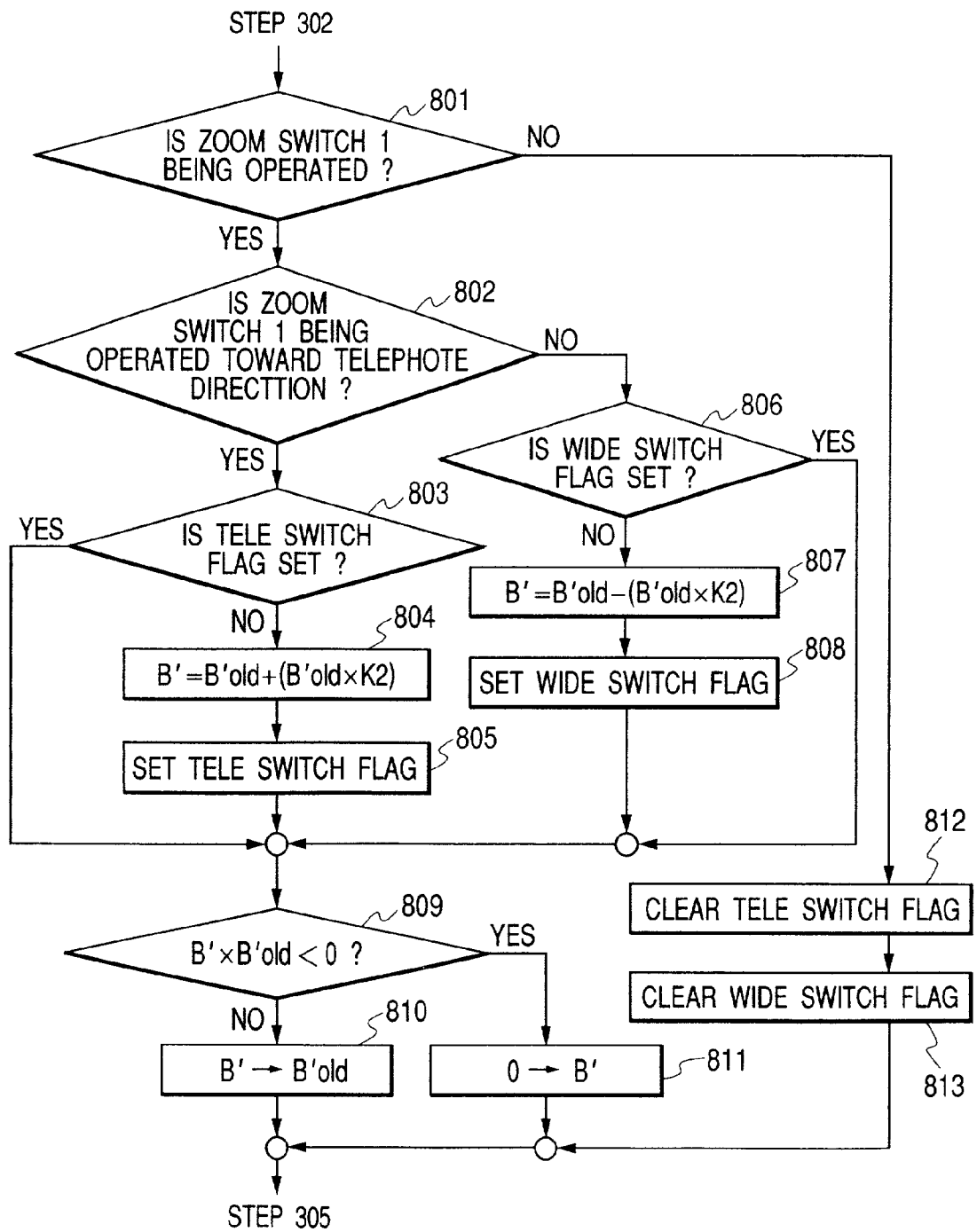
FIG. 10 is a flow chart showing processing of changing a preset value during preset drive control operation in a lens device according to the fifth embodiment of the present invention.

According to the fifth embodiment, the zoom driving velocity is increased when the zoom switch 1 is operated toward the telephoto direction regardless of the driving direction of the zoom lens optical system 9 during preset drive control operation, and decreased when the zoom switch 1 is operated toward the wide-angle direction. The relationship between the operation direction of the zoom switch and an increase/decrease in velocity may be reversed. That is, the zoom driving velocity may be increased when the zoom switch 1 is operated toward the wide-angle direction, and decreased when the zoom switch 1 is operated toward the telephoto direction. In this case, equation (7) in step 804 of FIG. 10 is rewritten to $$B'=B'\text{old}-(B'\text{old}\times K2)$$

and equation (8) in step 807 is rewritten to $$B'=B'\text{old}+(B'\text{old}\times K2)$$

(Sixth Embodiment)

In the fifth embodiment, a preset value is stored in the memory unit 20 only when the user turns on the memory switch 8 from the OFF state before the start of preset drive control, and a changed preset value is deleted at the end of preset drive control (only the original preset value is stored and held in the memory unit 20). Alternatively, a preset value changed in accordance with the operation of the zoom switch 1 during preset drive control operation may be stored and held in the memory unit 20.

The sixth embodiment in which a changed preset value is stored and held will be described. The sixth embodiment is the same as each of the above embodiments in the basic arrangement of a lens device, that the preset value is stored and set in accordance with the operation of a memory switch 8, and that the zoom driving velocity is increased/decreased depending on a preset value changed in accordance with the operation of a zoom switch 1 during preset drive control operation (except for steps 303 and 304 in the main routine of FIGS. 5A and 5B). The sixth embodiment replaces steps 303 and 304 in the main routine by steps shown in FIG. 11.

A CPU 6 shifts from step 302 in FIGS. 5A and 5B to step 851, and determines whether the zoom switch 1 is being operated. If No in step 851, the CPU 6 clears a TELE switch flag (step 852), clears a WIDE switch flag (step 853), and advances to step 305 in FIGS. 5A and 5B.

If Yes in step 851, the CPU 6 determines whether the zoom switch 1 is being operated toward the telephoto direction (step 852). If Yes in step 852, the CPU 6 checks whether the TELE switch flag is set (step 853). If Yes in step 853, the CPU 6 shifts to step 859; or if No, uses equation (9) to calculate a new preset value "B'" corresponding to one operation of the zoom switch 1 toward the telephoto direction during preset drive control operation (step 854):

$$B'=B'\text{old}+(B'\text{old}\times K2) \tag{9}$$

Note that equation (9) is the same as equation (7) in the fifth embodiment. Then, the CPU 6 sets the TELE switch flag (step 855).

From step 854, if the zoom switch 1 is operated once toward the telephoto direction, the preset value "B'" is changed to the high-velocity side with respect to B'old regardless of the operation amount (value of the zoom switch command signal "A").

If No in step 852, the CPU 6 checks whether the WIDE switch flag is set (step 856). If Yes in step 856, the CPU 6 advances to step 859; or if No, uses equation (10) to calculate a new preset value "B'" corresponding to one operation of the zoom switch 1 toward the wide-angle direction during preset drive control operation (step 857):

$$B'=B'\text{old}-(B'\text{old}\times K2) \quad (10)$$

Note that equation (10) is the same as equation (8) in the fifth embodiment. Thereafter, the CPU 6 sets the WIDE switch flag (step 858).

From step 857, if the zoom switch 1 is operated once toward the wide-angle direction, the preset value "B'" is changed to the low-velocity side with respect to B'old regardless of the operation amount (value of the zoom switch command signal "A").

The CPU 6 multiplies the preset value "B'" calculated in step 854 or 857 by the preset value B'old before the change, and determines whether the product is negative (step 859).

If the product is negative, the CPU 6 sets the preset value "B'" to 0 (stops driving of a zoom lens optical system 9) and holds this preset value "B'" in order to prevent the driving direction of the zoom lens optical system 9 from reversing as a result of changing the calculated preset value "B'" to the low-velocity side with respect to the preset value B'old before the change (step 861). If the product is not negative, the CPU 6 sets and holds the calculated preset value "B'" as a changed preset value "B'", and holds the calculated preset value "B'" as a preset value B'old (step 860).

The CPU 6 stores the held preset value "B'" in a memory unit 20 as a preset value "B" (step 862). The CPU 6 shifts from step 862 to step 305 in FIGS. 5A and 5B.

According to the sixth embodiment, similar to the fifth embodiment, when the zoom switch 1 is operated once toward the telephoto direction during preset drive control operation, the zoom driving velocity can be increased by an amount proportional to the zoom driving velocity (preset value B'old) at that time. When the zoom switch 1 is operated once toward the wide-angle direction, the zoom driving velocity can be decreased by an amount proportional to the zoom driving velocity (preset value B'old) at that time.

The main routine including steps 851 to 861 is repetitively executed during preset drive control operation. If the zoom switch 1 is operated toward the telephoto direction a plurality of number of times during the main routine, the zoom driving velocity is gradually increased every operation. If the zoom switch 1 is operated toward the wide-angle direction a plurality of number of times, the zoom driving velocity is gradually decreased every operation.

Moreover, according to the sixth embodiment, the preset value is stored and held in the memory unit 20 every time the preset value is changed during preset drive control operation. The finally changed preset value is stored and held in the memory unit 20, and can be used as a preset value at the start of the next preset drive control operation after the end of the current preset drive control operation. If the memory unit 20 is realized by a memory such as an EEPROM which holds the memory contents even after power-off operation, the finally changed preset value can be used as a preset value at the start of preset drive control operation from the next power-on operation.

Figure 11:
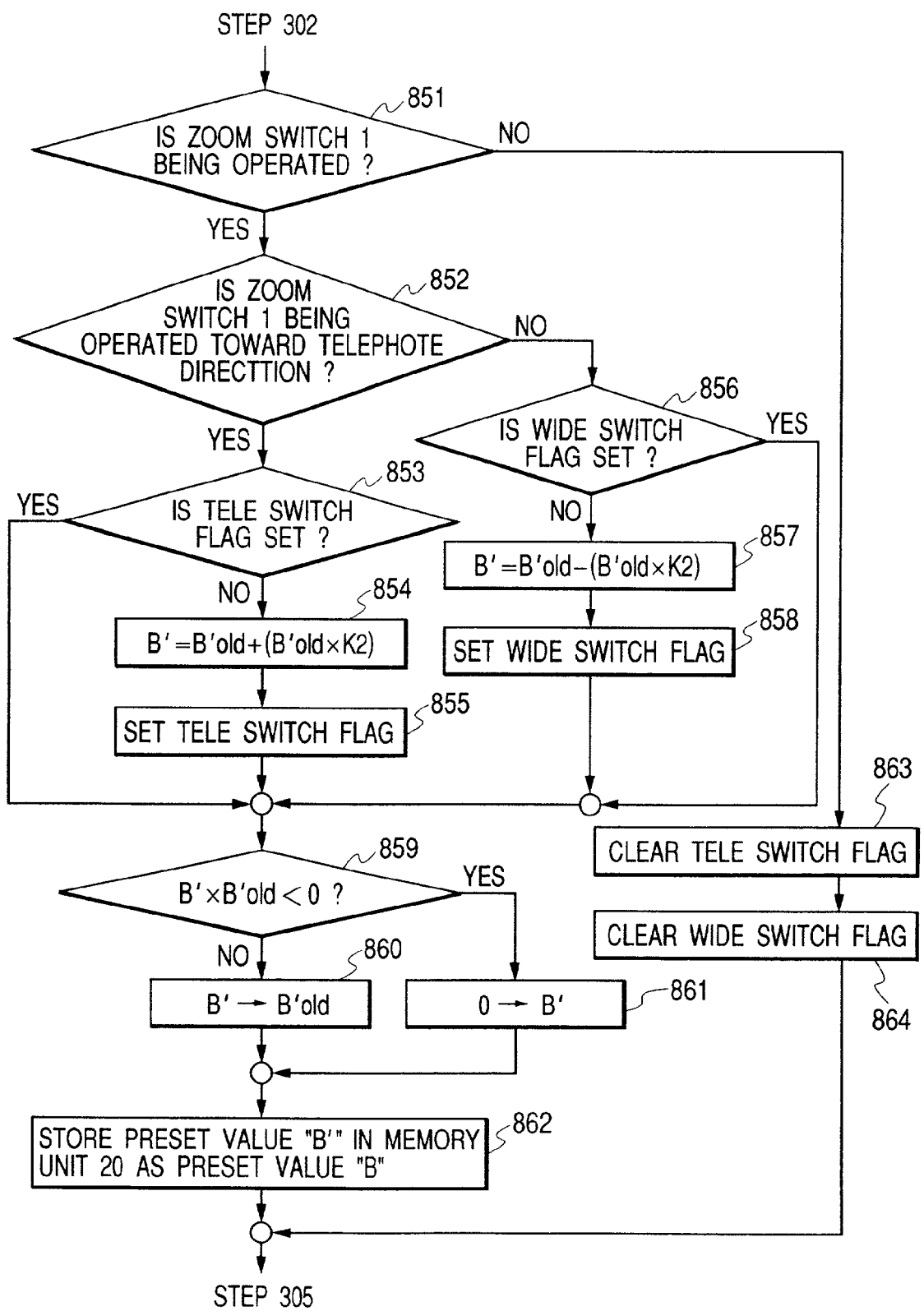
FIG. 11 is a flow chart showing processing of changing a preset value during preset drive control operation in a lens device according to the sixth embodiment of the present invention.

According to the sixth embodiment, the zoom driving velocity is increased when the zoom switch 1 is operated toward the telephoto direction regardless of the driving direction of the zoom lens optical system 9 during preset drive control operation, and decreased when the zoom switch 1 is operated toward the wide-angle direction. The relationship between the operation direction of the zoom switch and an increase/decrease in velocity may be reversed. That is, the zoom driving velocity may be increased when the zoom switch 1 is operated toward the wide-angle direction, and decreased when the zoom switch 1 is operated toward the telephoto direction. In this case, equation (9) in step 854 of FIG. 11 is rewritten to $$B'=B'\text{old}-(B'\text{old}\times K2)$$

and equation (10) in step 857 is rewritten to $$B'=B'\text{old}+(B'\text{old}\times K2)$$

(Seventh Embodiment)

In the fifth and sixth embodiments, the zoom driving velocity is increased every time the zoom switch 1 is operated once toward a predetermined one of the telephoto and wide-angle directions regardless of the zoom driving direction (preset direction) in preset drive control operation, and the zoom driving velocity is decreased every time the zoom switch 1 is operated once toward the other one of the telephoto and wide-angle directions. The relationship between the operation direction of the zoom switch 1 and an increase/decrease in velocity may be changed depending on the zoom driving direction in preset drive control operation.

The seventh embodiment in which the relationship between the operation direction of a zoom switch 1 and an increase/decrease in velocity is changed depending on the zoom driving direction in preset drive control operation will be described. The seventh embodiment is the same as each of the above embodiments in the basic arrangement of a lens device, that the preset value is stored and set in accordance with the operation of a memory switch 8, and that the zoom driving velocity is increased/decreased depending on a preset value changed in accordance with the operation of the zoom switch 1 during preset drive control operation (except for steps 303 and 304 in the main routine of FIGS. 5A and 5B). The seventh embodiment replaces steps 303 and 304 in the main routine by steps shown in FIG. 12.

A CPU 6 shifts from step 302 in FIGS. 5A and 5B to step 901, and determines whether the zoom switch 1 is being operated. If No in step 901, the CPU 6 clears a switch flag (step 910), and advances to step 305 in FIGS. 5A and 5B.

If Yes in step 901, the CPU 6 determines whether the switch flag is set (step 902). If Yes in step 902, the CPU 6 advances to step 907; or if No, checks whether the operation direction of the zoom switch 1 is identical with the preset direction indicated by the preset value "B'" (step 903).

If the operation direction of the zoom switch 1 is identical with the preset direction (zoom driving direction) indicated by the preset value "B'" (Yes in step 903), the CPU 6 uses equation (11) to calculate a new preset value "B'" corresponding to one operation of the zoom switch 1 toward the direction identical with the preset direction during preset drive control operation (step 904):

$$B'=B'\text{old}+(B'\text{old}\times K2) \quad (11)$$

where K2 is a constant. The CPU 6 shifts to step 906 and sets the switch flag.

From step 904, if the zoom switch 1 is operated once toward the direction identical with the preset direction, the preset value "B'" is changed to the high-velocity side with respect to B'old regardless of the operation amount (value of the zoom switch command signal "A").

If No in step 903, the CPU 6 uses equation (12) to calculate a new preset value "B'" corresponding to one operation of the zoom switch 1 toward a direction opposite to the preset direction during preset drive control operation (step 905):

$$B'=B'\text{old}-(B'\text{old}\times K2) \quad (12)$$

where K2 is a constant. The CPU 6 advances to step 906 and sets the switch flag.

From step 905, if the zoom switch 1 is operated once toward a direction opposite to the preset direction, the preset value "B'" is changed to the low-velocity side with respect to B'old regardless of the operation amount (value of the zoom switch command signal "A").

Note that B'old is a preset value obtained in step 318 of FIGS. 5A and 5B at the start of preset drive control operation or a preset value changed in the previous routine. That is, the preset value "B'" calculated by equation (11) or (12) is a value attained by changing, to the high- or low-velocity side, a preset value "B" set by general preset value setting operation, or a value attained by changing again, to the high- or low-velocity side, a preset value "B'" which has already been changed.

The CPU 6 multiplies the preset value "B'" calculated in step 904 or 905 by the preset value B'old before the change, and determines whether the product is negative (step 907).

If the product is negative, the CPU 6 sets the preset value "B'" to 0 (stops driving of a zoom lens optical system 9) and holds this preset value "B'" in order to prevent the driving direction of the zoom lens optical system 9 from reversing as a result of changing the calculated preset value "B'" to the low-velocity side with respect to the preset value B'old before the change (step 909). If the product is not negative, the CPU 6 sets and holds the calculated preset value "B'" as a changed preset value "B'", and holds the calculated preset value "B'" as a preset value B'old (step 908). Thereafter, the CPU 6 shifts from step 908 or 909 to step 305 in FIGS. 5A and 5B.

According to the seventh embodiment, when the zoom switch 1 is operated once toward the direction corresponding to the zoom driving direction during preset drive control operation, the zoom driving velocity can be increased by an amount proportional to the zoom driving velocity (preset value B'old) at that time. When the zoom switch 1 is operated once toward a direction opposite to the direction corresponding to the zoom driving direction, the zoom driving velocity can be decreased by an amount proportional to the zoom driving velocity (preset value B'old) at that time.

The main routine including steps 901 to 910 is repetitively executed during preset drive control operation. If the zoom switch 1 is operated toward the direction corresponding to the zoom driving direction a plurality of number of times during the main routine, the zoom driving velocity is gradually increased every operation. If the zoom switch 1 is operated toward a direction opposite to the direction corresponding to the zoom driving direction a plurality of number of times, the zoom driving velocity is gradually decreased every operation.

Figure 12:
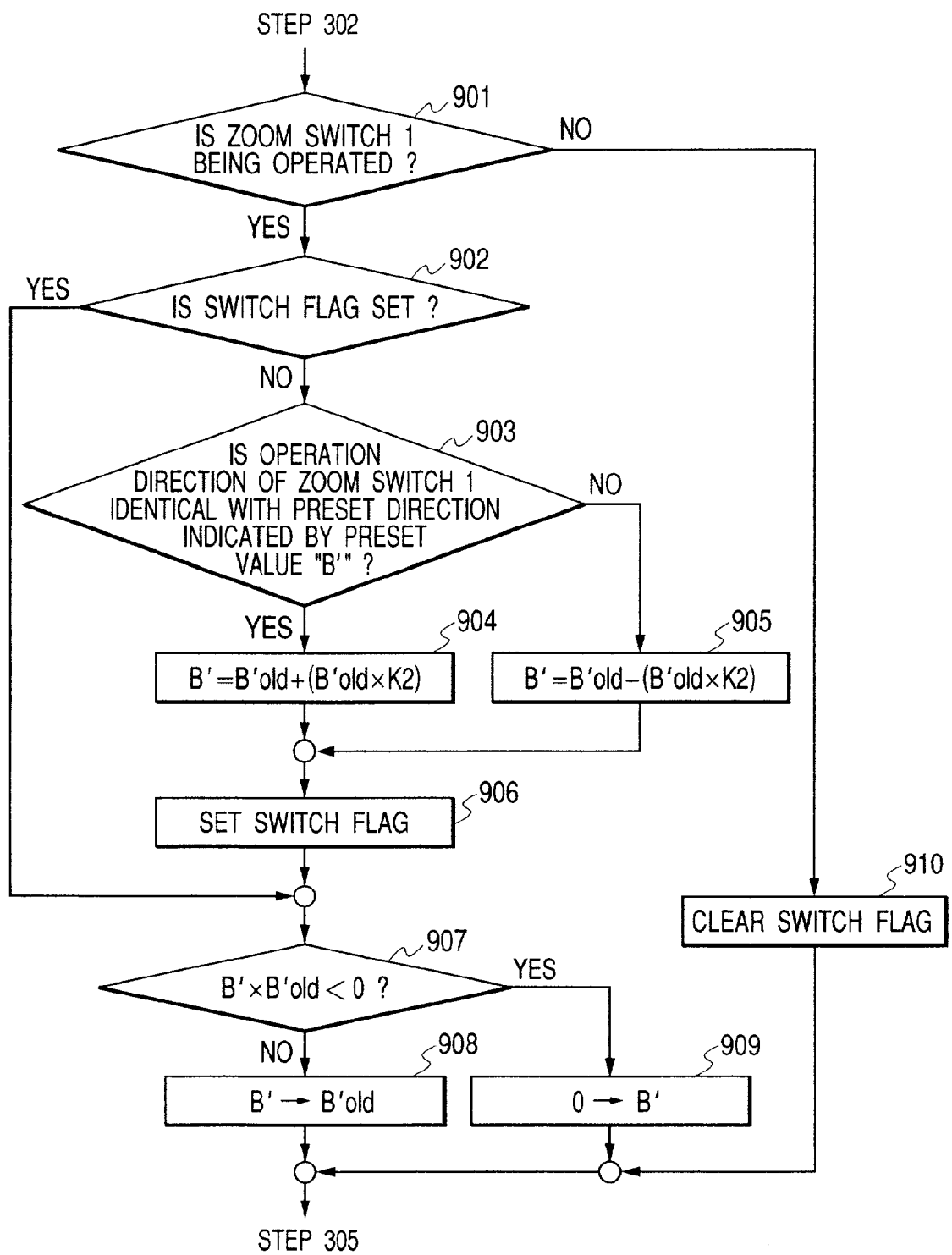
FIG. 12 is a flow chart showing processing of changing a preset value during preset drive control operation in a lens device according to the seventh embodiment of the present invention.

In the seventh embodiment, the zoom driving velocity is increased when the zoom switch 1 is operated toward the operation direction corresponding to the zoom driving direction during preset drive control operation, and decreased when the zoom switch 1 is operated toward the opposite direction. The relationship between the operation direction of the zoom switch and an increase/decrease in velocity may be reversed. That is, the zoom driving velocity may be increased when the zoom switch 1 is operated toward a direction opposite to the direction corresponding to the zoom driving direction, and decreased when the zoom switch 1 is operated toward the direction corresponding to the zoom driving direction. In this case, equation (11) in step 904 of FIG. 12 is rewritten to $$B'=B'\text{old}-(B'\text{old}\times K2)$$

and equation (12) in step 905 is rewritten to $$B'=B'\text{old}-(B'\text{old}\times K2)$$

(Eighth Embodiment)

In the seventh embodiment, a preset value is stored in the memory unit 20 only when the user turns on the memory switch 8 from the OFF state before the start of preset drive control, and a changed preset value is deleted at the end of preset drive control (only the original preset value is stored and held in the memory unit 20). Alternatively, a preset value changed in accordance with the operation of the zoom switch 1 during preset drive control operation may be stored and held in the memory unit 20.

The eighth embodiment in which a changed preset value is stored and held will be described. The eighth embodiment is the same as each of the above embodiments in the basic arrangement of a lens device, that the preset value is stored and set in accordance with the operation of a memory switch 8, and that the zoom driving velocity is increased/decreased depending on a preset value changed in accordance with the operation of the zoom switch 1 during preset drive control operation (except for steps 303 and 304 in the main routine of FIGS. 5A and 5B). The eighth embodiment replaces steps 303 and 304 in the main routine by steps shown in FIG. 13.

A CPU 6 shifts from step 302 in FIGS. 5A and 5B to step 951, and determines whether the zoom switch 1 is being operated. If No in step 951, the CPU 6 clears a switch flag (step 960), and advances to step 305 in FIGS. 5A and 5B.

If Yes in step 951, the CPU 6 determines whether the switch flag is set (step 952). If Yes in step 952, the CPU 6 advances to step 957; or if No, checks whether the operation direction of the zoom switch 1 is identical with the preset direction indicated by the preset value "B'" (step 953).

If the operation direction of the zoom switch 1 is identical with the preset direction (zoom driving direction) indicated by the preset value "B'" (Yes in step 953), the CPU 6 uses equation (13) to calculate a new preset value "B'" corresponding to one operation of the zoom switch 1 toward the direction identical with the preset direction during preset drive control operation (step 954):

$$B'=B'\text{old}+(B'\text{old}\times K2) \quad (13)$$

Note that equation (13) is the same as equation (11) in the seventh embodiment. The CPU 6 shifts to step 956 and sets the switch flag.

From step 954, if the zoom switch 1 is operated once toward the direction identical with the preset direction, the preset value "B'" is changed to the high-velocity side with respect to B'old regardless of the operation amount (value of the zoom switch command signal "A").

If No in step 953, the CPU 6 uses equation (14) to calculate a new preset value "B'" corresponding to one operation of the zoom switch 1 toward a direction opposite to the preset direction during preset drive control operation (step 955):

$$B'=B'\text{old}-(B'\text{old}\times K2) \quad (14)$$

Note that equation (14) is the same as equation (12) in the seventh embodiment. The CPU 6 advances to step 956 and sets the switch flag.

From step 955, if the zoom switch 1 is operated once toward a direction opposite to the preset direction, the preset value "B'" is changed to the low-velocity side with respect to B'old regardless of the operation amount (value of the zoom switch command signal "A").

Note that B'old is a preset value obtained in step 318 of FIGS. 5A and 5B at the start of preset drive control operation or a preset value changed in the previous routine. That is, the preset value "B'" calculated by equation (13) or (14) is a value attained by changing, to the high- or low-velocity side, a preset value "B" set by general preset value setting operation, or a value attained by changing again, to the high- or low-velocity side, a preset value "B" which has already been changed.

The CPU 6 multiplies the preset value "B'" calculated in step 954 or 955 by the preset value B'old before the change, and determines whether the product is negative (step 957).

If the product is negative, the CPU 6 sets the preset value "B'" to 0 (stops driving of a zoom lens optical system 9) and holds this preset value "B'" in order to prevent the driving direction of the zoom lens optical system 9 from reversing as a result of changing the calculated preset value "B'" to the low-velocity side with respect to the preset value B'old before the change (step 959). If the product is not negative, the CPU 6 sets and holds the calculated preset value "B'" as a changed preset value "B'", and holds the calculated preset value "B'" as a preset value B'old (step 958).

The CPU 6 stores the held preset value "B'" in a memory unit 20 as a preset value "B" (step 960). Then, the CPU 6 shifts from step 960 to step 305 in FIGS. 5A and 5B.

According to the eighth embodiment, similar to the seventh embodiment, when the zoom switch 1 is operated once toward the direction corresponding to the zoom driving direction during preset drive control operation, the zoom driving velocity can be increased by an amount proportional to the zoom driving velocity (preset value B'old) at that time. When the zoom switch 1 is operated once toward a direction opposite to the direction corresponding to the zoom driving direction, the zoom driving velocity can be decreased by an amount proportional to the zoom driving velocity (preset value B'old) at that time.

The main routine including steps 951 to 960 is repetitively executed during preset drive control operation. If the zoom switch 1 is operated toward the direction corresponding to the zoom driving direction a plurality of number of times during the main routine, the zoom driving velocity is gradually increased every operation. If the zoom switch 1 is operated toward a direction opposite to the direction corresponding to the zoom driving direction a plurality of number of times, the zoom driving velocity is gradually decreased every operation.

According to the eighth embodiment, the preset value is stored and held in the memory unit 20 every time the preset value is changed during preset drive control operation. The finally changed preset value is stored and held in the memory unit 20, and can be used as a preset value at the start of the next preset drive control operation after the end of the current preset drive control operation. If the memory unit 20 is realized by a memory such as an EEPROM which holds the memory contents even after power-off operation, the finally changed preset value can be used as a preset value at the start of preset drive control operation from the next power-on operation.

Figure 13:
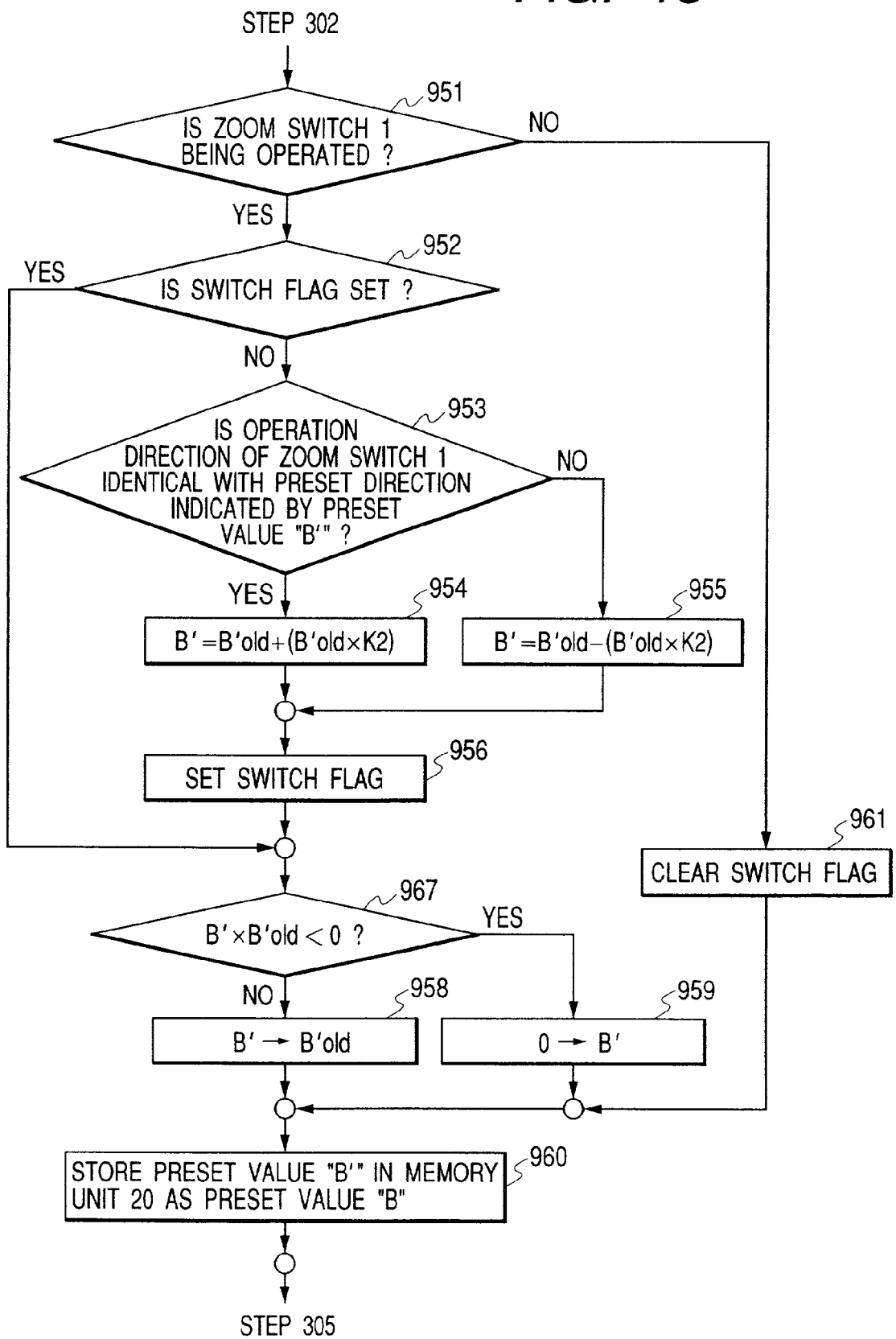
FIG. 13 is a flow chart showing processing of changing a preset value during preset drive control operation in a lens device according to the eighth embodiment of the present invention.

In the eighth embodiment, the zoom driving velocity is increased when the zoom switch 1 is operated toward the operation direction corresponding to the zoom driving direction during preset drive control operation, and decreased when the zoom switch 1 is operated toward the opposite direction. The relationship between the operation direction of the zoom switch and an increase/decrease in velocity may be reversed. That is, the zoom driving velocity may be increased when the zoom switch 1 is operated toward a direction opposite to the direction corresponding to the zoom driving direction, and decreased when the zoom switch 1 is operated toward the direction corresponding to the zoom driving direction. In this case, equation (13) in step 954 of FIG. 13 is rewritten to $$B'=B'\text{old}-(B'\text{old}\times K2)$$

and equation (14) in step 955 is rewritten to $$B'=B'\text{old}-(B'\text{old}\times K2)$$

In the first to eighth embodiments, the zoom switch 1 is adopted as an operation means (predetermined operation means) for changing a preset value in preset drive control operation.

Alternatively, the operation means may be the thumb ring of a zoom demand used to drive the zoom lens optical system by remote control, or a switch dedicated to changing the preset velocity.

In the first to eighth embodiments, preset velocity information and preset direction information are stored as a preset value. The present invention can also be applied to a case wherein preset velocity information and preset position information are stored, and preset drive control is done to drive the zoom lens optical system to a position corresponding to the preset position information at a velocity corresponding to the preset velocity information. In this case, the zoom driving velocity may be increased (or decreased) in accordance with the operation of the zoom switch toward the telephoto direction regardless of the zoom driving direction in preset drive control operation, and decreased (or increased) in accordance with the operation toward the wide-angle direction. Alternatively, the zoom driving velocity may be increased (or decreased) when the zoom switch is operated in the operation direction corresponding to the zoom driving direction in preset drive control operation, and decreased (or increased) when the zoom switch is operated in the opposite operation direction.

In the third, fourth, seventh, and eighth embodiments, an increase/decrease in preset value is determined from the relationship between the preset direction represented by the preset value and the operation direction of the zoom switch. Alternatively, an increase/decrease in preset value may be determined from the relationship between the direction component of a velocity signal output from the velocity detector 14 and the operation direction of the zoom switch.

(Ninth Embodiment)

Figure 14:
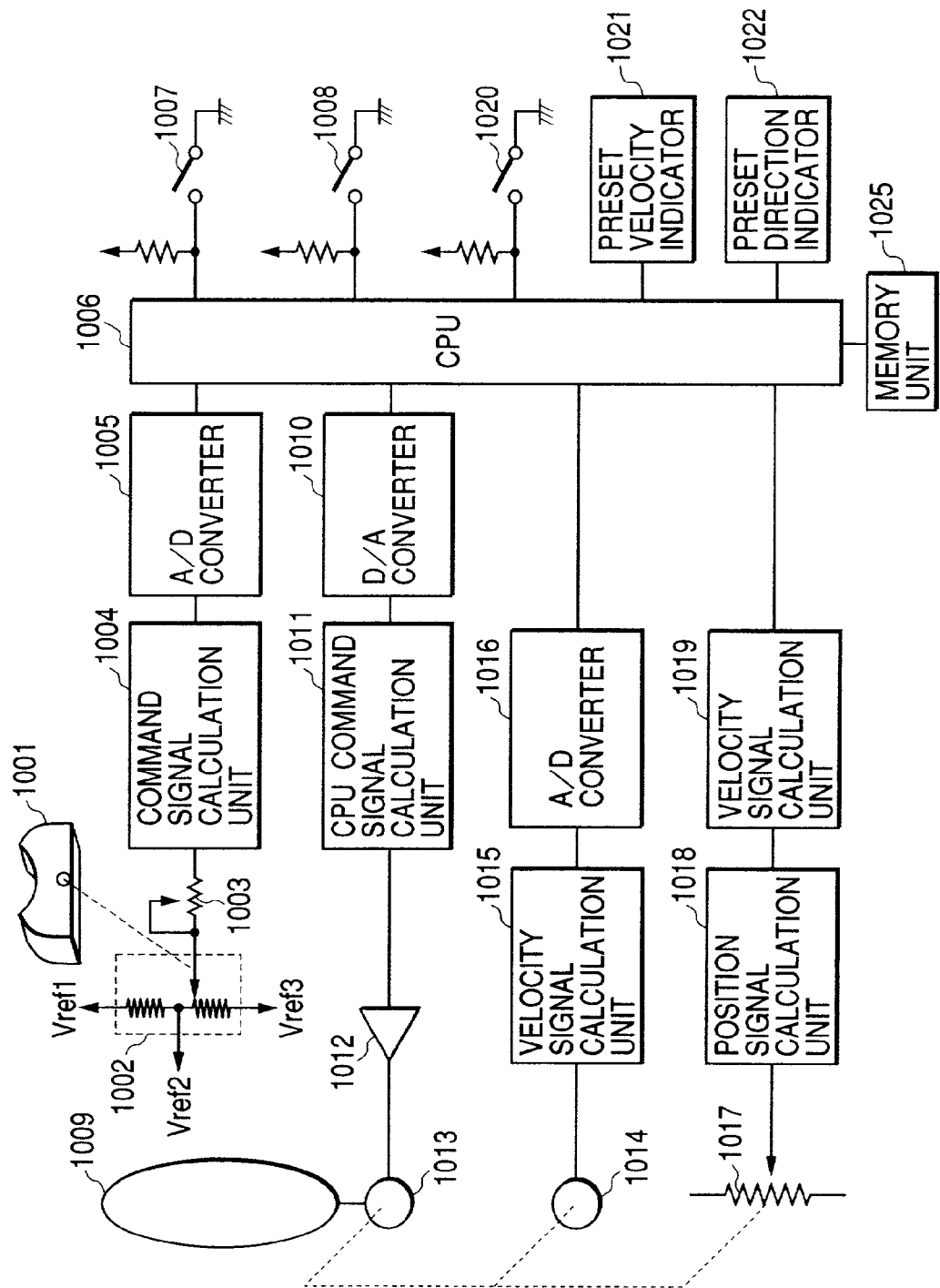
FIG. 14 is a block diagram showing the arrangement of a lens device according to the ninth embodiment of the present invention.
Figure 15:
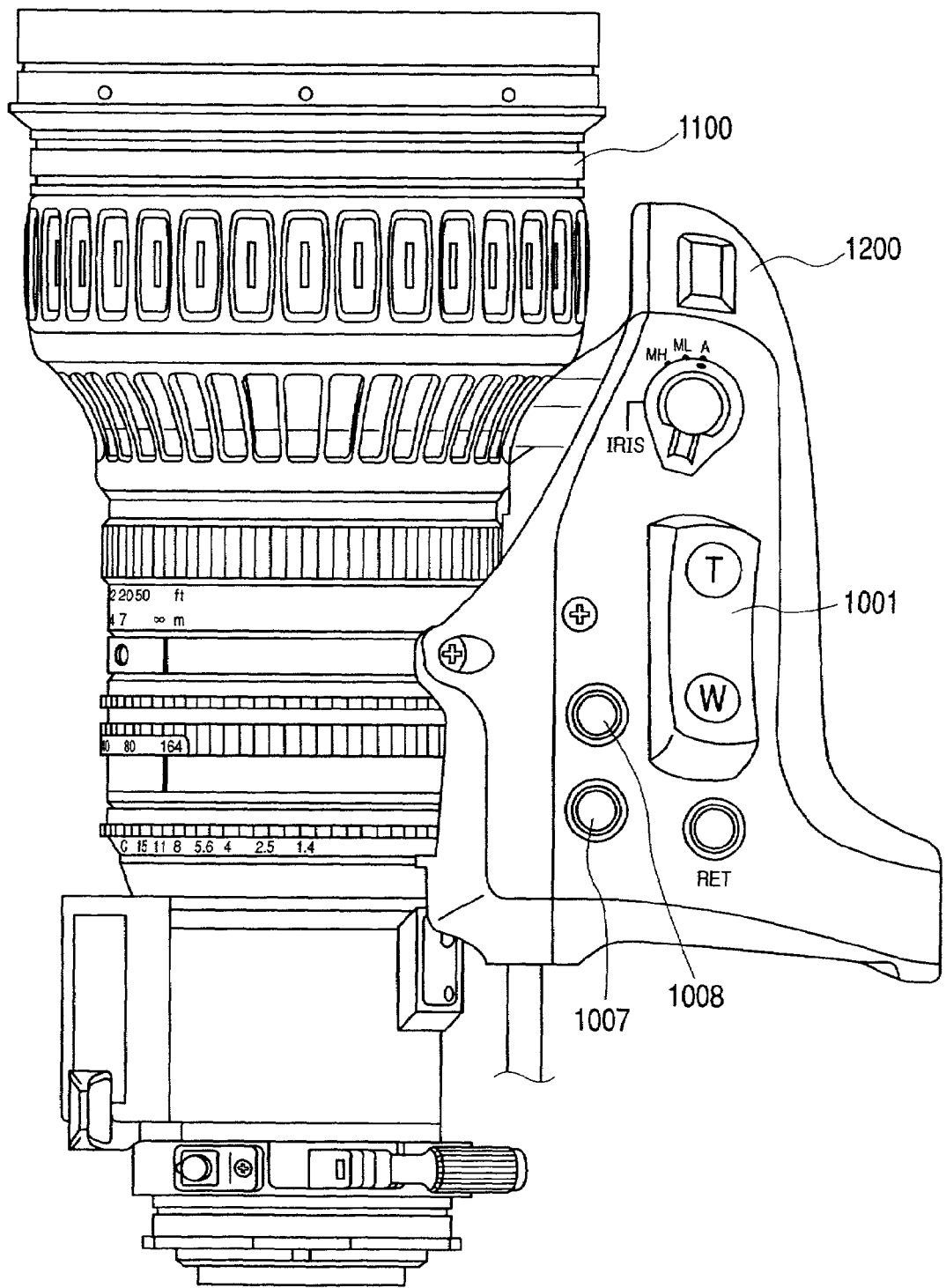
FIG. 15 is a plan view showing the outer appearance of the lens device.

FIG. 14 shows the arrangement of a lens device (optical device) according to the ninth embodiment of the present invention. FIG. 15 is a plan view showing the outer appearance of the upper part of the lens device.

In FIGS. 14 and 15, a zoom switch 1001 is operated by the user. A command signal generator 1002 outputs a command signal for designating the driving direction and driving velocity (or driving amount and driving position) of a zoom lens optical system (optical adjustment means) 1009 that are proportional to the operation amount of the zoom switch 1001.

A zoom velocity variable volume control 1003 changes the command signal level corresponding to the operation amount of the zoom switch 1001. A command signal calculation unit 1004 performs signal level shift conversion in order to supply a command signal to an A/D converter 1005. The A/D converter 1005 converts an analog signal output from the command signal calculation unit 1004 to a digital signal. A CPU 1006 controls preset drive control operation and other lens device operations.

A preset switch (preset drive start operation means) 1007 is operated to designate the start and end of preset drive control operation. A memory switch (storage designation operation means) 1008 designates storage of a preset direction and preset velocity.

The zoom lens optical system 1009 adjusts the magnification of the lens device. A D/A converter 1010 converts a command signal output from the CPU 1006 and adapted to drive the zoom lens optical system 1009, from a digital signal to an analog signal.

A CPU command signal calculation unit 1011 performs signal level shift conversion of the command signal output from the D/A converter 1010. A power amplifier 1012 drives a motor 1013 serving as a driving source for the zoom lens optical system 1009.

A velocity detector 1014 outputs a velocity signal corresponding to the driving velocity of the zoom lens optical system 1009. A velocity signal calculation unit 1015 performs signal level shift conversion in order to supply the output velocity signal to an A/D converter 1016. The A/D converter 1016 converts an analog signal output from the velocity signal calculation unit 1015 to a digital signal.

A position detector 1017 outputs a position signal corresponding to the position of the zoom lens optical system 1009. A position signal calculation unit 1018 performs signal level shift conversion in order to supply the position signal to an A/D converter 1019. The A/D converter 1019 converts an analog signal output from the position signal calculation unit 1018 to a digital signal.

A preset direction change switch (predetermined operation means) 1020 designates to change the preset direction in preset drive control operation. A preset velocity indicator 1021 indicates the preset velocity in preset drive control operation. A preset direction indicator 1022 indicates the preset direction in preset operation.

A memory unit (memory means) 1025 is represented by an EEPROM which stores a preset value, and is connected to the CPU 1006.

In FIG. 15, a lens device main body 1100 stores an optical adjustment means such as the zoom lens optical system 1009 and a stop device (not shown). A driving unit 1200 comprises the zoom switch 1001, the preset switch 1007, the memory switch 1008, and a control circuit including the CPU 1006 and motor 1013, and is mounted on (or connected to) the lens device main body 1100. An output from the motor 1013 is transmitted to the zoom lens optical system 1009 of the lens device main body 1100 via a reduction gear (not shown) or the like. The lens device main body 1100 is mounted on a camera (not shown) and constitutes a camera system.

In this arrangement, control in driving the zoom lens optical system 1009 via the zoom switch 1001 will be explained.

The command signal generator 1002 outputs a zoom switch command signal for designating the driving direction and driving velocity of the zoom lens optical system 1009 in proportion to the operation amount of the zoom switch 1001. This zoom switch command signal is input to the CPU 1006 via the zoom velocity variable volume control 1003, command signal calculation unit 1004, and A/D converter 1005.

The CPU 1006 obtains a CPU command signal in accordance with the zoom switch command signal and inputs it to the power amplifier 1012 via the D/A converter 1010 and CPU command signal calculation unit 1011. The power amplifier 1012 drives the motor 1013 based on the input CPU command signal and drives the zoom lens optical system 1009.

Figure 16:
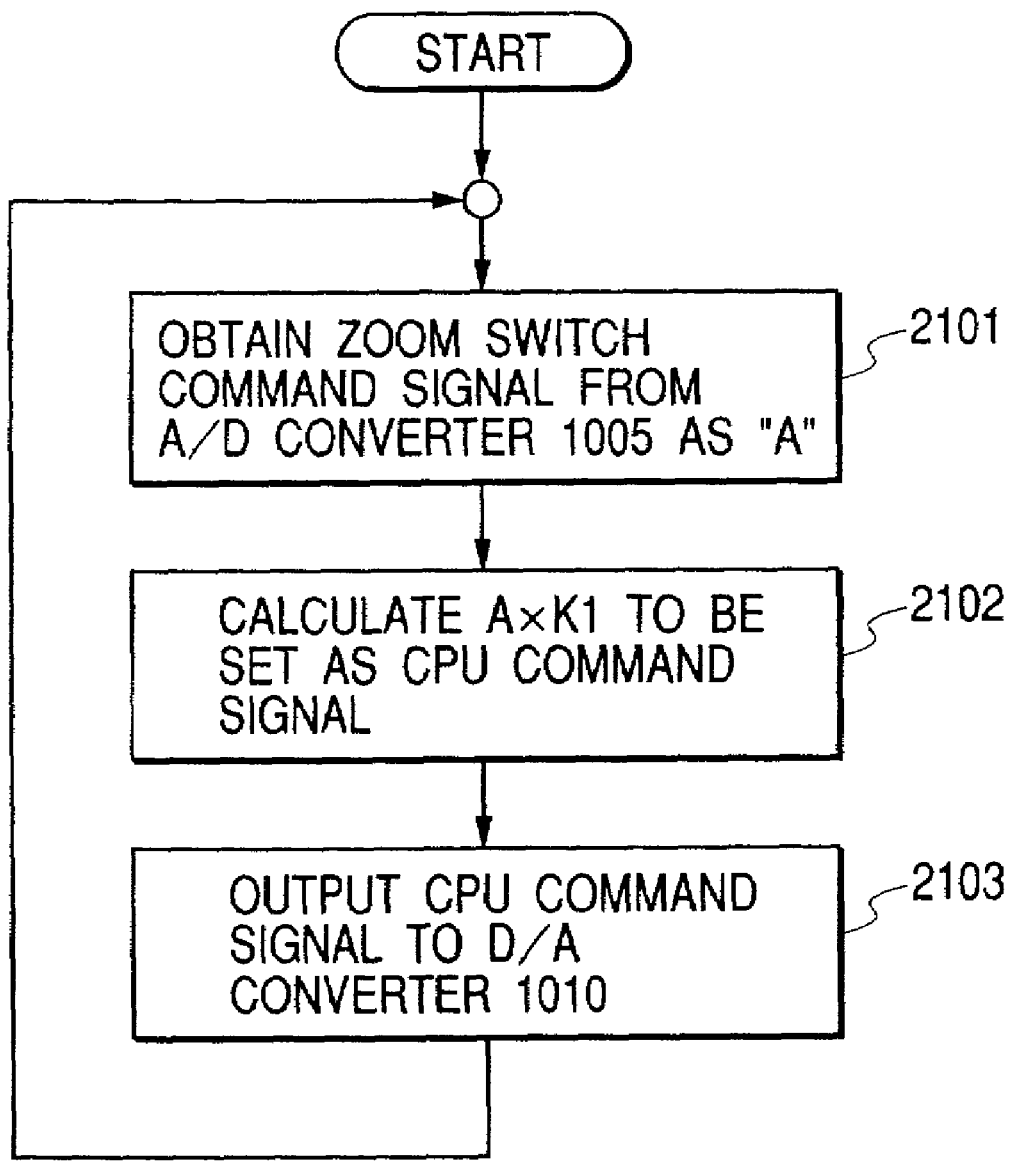
FIG. 16 is a flow chart showing processing when general driving of a zoom lens optical system is done with a zoom switch in the lens device.

Processing of the CPU 1006 at this time will be described with reference to FIG. 16. The CPU 1006 obtains a zoom switch command signal from the A/D converter 1005 as "A" (step 2101). The polarity of the zoom switch command signal "A", i.e., the driving direction of the zoom lens optical system 1009 is represented by "positive/negative". Driving toward the telephoto direction is defined as "positive", and driving toward the wide-angle direction is as "negative".

The driving velocity is given by a numerical value. More specifically, the driving velocity is represented by "0" when the stop of the zoom lens optical system 1009 is designated. As the value becomes larger from "1", the driving velocity of the zoom lens optical system 1009 increases. The driving velocity is represented by "100" when the maximum velocity of the zoom lens optical system 1009 drivable by the lens device is designated.

The zoom switch command signal "A" obtained in step 2101 is multiplied by a constant K1, and the product is set as a CPU command signal (step 2102). The CPU command signal is output to the D/A converter 1010 (step 2103). As a result, the zoom lens optical system 1009 is driven by an amount proportional to the operation amount of the zoom switch 1001 toward the driving direction corresponding to the operation direction.

Setting of a preset value (preset velocity information and preset direction designation information) representing a preset velocity and direction in the use of a preset drive control function, and preset drive control operation will be explained.

Setting of a preset value representing a preset velocity and direction will be described. A velocity signal from the velocity detector 1014 that corresponds to the driving velocity of the zoom lens optical system 1009 is input to the CPU 1006 via the velocity signal calculation unit 1015 and A/D converter 1016. If the zoom switch 1001 is operated, a zoom switch command signal proportional to the operation amount is input to the CPU 1006, which can determine whether the zoom switch 1001 is being operated.

The preset velocity is set when the user operates the zoom switch 1001 and turns on the memory switch 1008 from the OFF state while driving the zoom lens optical system 1009 at a velocity toward a direction which the user wants to preset. That is, a velocity signal (signal corresponding to the driving velocity and driving direction of the zoom lens optical system 1009) from the velocity detector 1014 when the memory switch 1008 in the OFF state is turned on is obtained by the CPU 1006 and stored as a preset value "B" in the memory unit 1025.

Processing of the CPU 1006 at this time will be explained with reference to FIG. 17. The CPU 1006 determines whether the preset value "B" has been stored in the memory unit 1025 as initial setting (step 2201). If No in step 2201, i.e., no preset value has been set, a preset value "B" representing a predetermined zoom driving velocity such as a maximum velocity and a predetermined zoom driving direction such as a telephoto direction or wide-angle direction is stored in the memory unit 1025 (step 2202).

The preset value "B" at initial setting may be a user-desired zoom driving velocity as a zoom driving velocity or a user-desired zoom driving direction as a zoom driving direction. The preset value "B" is represented by a numerical value having a polarity. The polarity is determined by the driving direction, i.e., positive for driving toward the telephoto direction and negative for driving toward the wide-angle direction. The value represents a driving velocity. The driving velocity is "0" when the stop of zoom driving is set as a preset value. As the value becomes larger from "1", the zoom driving velocity increases. The driving velocity is "100" when driving at the maximum velocity drivable by the lens device is set as a preset value.

After this processing, the CPU 1006 obtains the driving velocity (to be referred to as a zoom velocity hereinafter) and driving direction (to be referred to as a zoom direction hereinafter) of the zoom lens optical system 1009 from the A/D converter 1016 (step 2203). Then, the CPU 1006 obtains data of the A/D converter 1005 and determines whether the zoom switch 1001 is being operated (step 2204). If No in step 2204, the CPU 1006 obtains a zoom velocity and zoom direction from the A/D converter 1016 again (step 2203).

If Yes in step 2204, the CPU 1006 determines whether the memory switch 1008 has been changed from the OFF state to the ON state (step 2205). If No in step 2205, the CPU 1006 obtains a zoom velocity and zoom direction from the A/D converter 1016 again (step 2203). If Yes in step 2205, the CPU 1006 stores the zoom velocity and zoom direction obtained in step 2203 in the memory unit 1025 as a new preset value "B" (step 2206).

Preset drive control operation will be described. Preset drive control operation starts when a CPU command signal (CPU command signal corresponding to the preset value "B") output from the CPU 1006 upon the first ON operation of the preset switch 1007 is input to the power amplifier 1012 via the D/A converter 1010 and CPU command signal calculation unit 1011. After the start of preset drive control operation, driving of the zoom lens optical system 1009 at a pre-stored preset velocity toward a pre-stored preset direction continues until the zoom lens optical system 1009 reaches the end of its movable range in the lens device or the preset switch 1007 is turned on again during driving. In the ninth embodiment, the preset direction can be changed by operating the preset direction change switch 1020 during preset drive control operation.

Processing of the CPU 1006 at this time will be explained with reference to FIGS. 18A and 18B. The CPU 1006 checks whether the state of the preset direction change switch 1020 is changed (step 2301). If No in step 2301, the CPU 1006 advances to step 2303.

In step 2303, the CPU 1006 determines whether preset drive control is being operated. If No in step 2303, the CPU 1006 advances to step 2316.

In step 2316, the CPU 1006 determines whether the preset switch 1007 has been changed from the OFF state to the ON state. If No in step 2316, the CPU 1006 returns to step 2301; or if Yes, determines whether preset drive control operation is being performed (step 2317). If No in step 2317, the CPU 1006 starts preset drive control operation (step 2318).

After the start of preset drive control operation, if the CPU 1006 determines in step 2301 that the state of the preset direction change switch 1020 is not changed and determines in step 2303 that preset drive control is being operated, the CPU 1006 shifts to step 2304 and obtains the current zoom velocity and zoom direction from the A/D converter 1016. In step 2305, the CPU 1006 obtains the current position (to be referred to as a zoom position hereinafter) of the zoom lens optical system 1009 from the A/D converter 1019.

The CPU 1006 determines whether the zoom position obtained in step 2305 is on the end of the movable range of the lens device (step 2306). If Yes in step 2306, the CPU 1006 ends preset drive control operation (step 2311).

Figure 17:
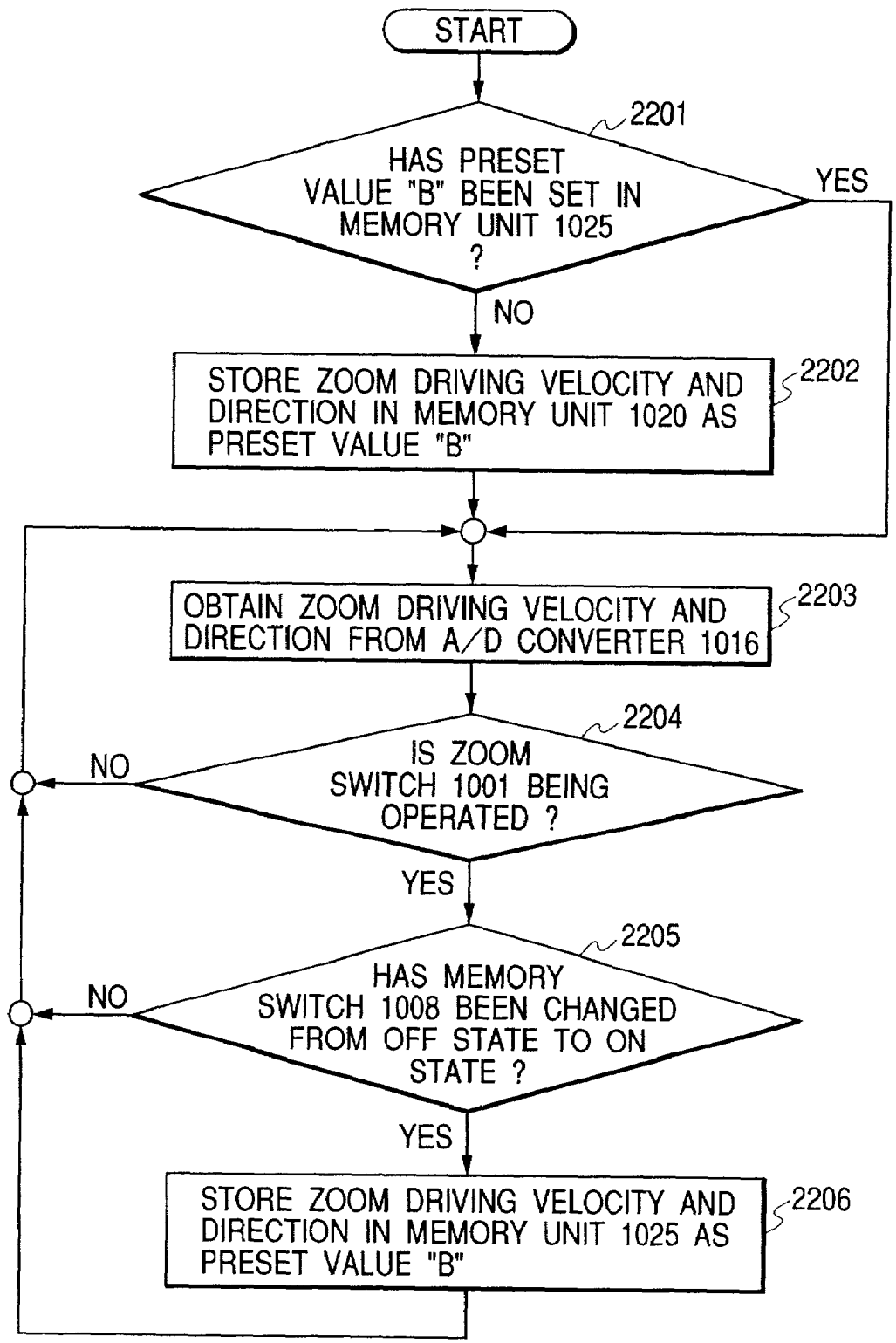
FIG. 17 is a flow chart showing processing when the preset velocity and preset direction in the lens device are set and stored.

If No in step 2306, the CPU 1006 determines whether the zoom velocity obtained in step 2304 is the velocity corresponding to the preset value "B" set in the flow chart of FIG. 17 (step 2307).

If No in step 2307, the CPU 1006 determines whether the velocity corresponding to the preset value "B" is higher than the zoom velocity (step 2308). If the zoom velocity is lower (Yes in step 2308), the CPU 1006 increases the CPU command signal value output to the D/A converter 1010, and increases the zoom velocity to the velocity corresponding to the preset value "B" (step 2310). If the zoom velocity is higher than the velocity corresponding to the preset value "B" (No in step 2309), the CPU 1006 decreases the CPU command signal value output to the D/A converter 1010, and decreases the zoom velocity to the velocity corresponding to the preset value "B" (step 2311). After that, the CPU 1006 indicates the preset velocity on the preset velocity indicator 1021 (step 2312).

The CPU 1006 determines whether the zoom direction obtained in step 2304 is identical with the preset direction represented by the preset value "B" (step 2313). If No in step 2313, the CPU 1006 drives the zoom lens optical system 1009 toward a direction opposite to the current zoom direction (step 2314), and advances to step 2315. If Yes in step 2313, the CPU 1006 directly advances to step 2315. In step 2315, the CPU 1006 indicates the preset direction on the preset direction indicator 1022.

In step 2316, the CPU 1006 determines whether the preset switch 1007 has been changed from the OFF state to the ON state. If No in step 2316, the CPU 1006 repeats steps 2301 to 2315 again. At this time, if the state of the preset direction change switch 1020 is changed (from the OFF state to the ON state) in step 2301, the CPU 1006 shifts to step 2302 and reverses the polarity of the preset value "B". As a result, the zoom direction obtained in step 2304 becomes different from the preset direction (No in step 2313), and the driving direction of the zoom lens optical system 1009 is reversed (step 2314). Since the preset value "B" does not change, the driving velocity of the zoom lens optical system 1009 does not change.

Preset drive control operation continues after the preset direction and the actual driving direction of the zoom lens optical system 1009 are reversed in the above fashion. If the CPU 1006 determines in step 2316 that the preset switch 1007 has been changed from the OFF state to the ON state and determines in step 2317 that preset drive control operation is being performed, the CPU 1006 ends preset drive control operation (step 2319).

As described above, according to the ninth embodiment, the preset direction can be changed (preset velocity is maintained) and the driving direction of the zoom lens optical system 1009 can be reversed by operating the preset direction change switch 1020 in preset drive control operation. The indicators 1021 and 1022 for indicating a preset direction and preset velocity allow the user to visually recognize them. This is useful especially in zoom driving at a low velocity (constant velocity), like preset drive control of the ninth embodiment.

In the ninth embodiment, the currently set preset direction (changed preset direction) is indicated on the preset direction indicator 1022. Alternatively, the original preset direction may be indicated regardless of whether the preset direction has been changed, in order to prevent the user from losing the original preset direction after the preset direction is changed.

In the ninth embodiment, the preset velocity during preset drive control operation is indicated on the preset velocity indicator 1021. Alternatively, the actual driving velocity of the zoom lens optical system 1009 at that time may be indicated on the preset velocity indicator 1021.

In the ninth embodiment, a preset direction as a target zoom driving direction is stored in advance as preset direction designation information, and the zoom lens optical system 1009 is driven toward the direction corresponding to the preset direction. The present invention can also be applied to a case wherein a preset position as a target zoom position is stored in advance as preset direction designation information, and the zoom lens optical system 1009 is driven toward the direction corresponding to the preset position. In this case, for example, if the preset direction change switch 1020 is operated while the zoom lens optical system 1009 is driven toward the direction corresponding to the preset position, the preset position is changed to an end (telephoto end or wide-angle end) of the movable range opposite to the current driving direction.

(10th Embodiment)

In the ninth embodiment, a preset value is stored in the memory unit 1025 only when the user turns on the memory switch 1008 from the OFF state before the start of preset drive control, and a changed preset value is deleted at the end of preset drive control (only the original preset value is stored and held in the memory unit 1025). Alternatively, a preset value changed in polarity (direction) in accordance with the operation of the preset direction change switch 1020 during preset drive control operation may be stored and held in the memory unit 1025.

Figure 18B:
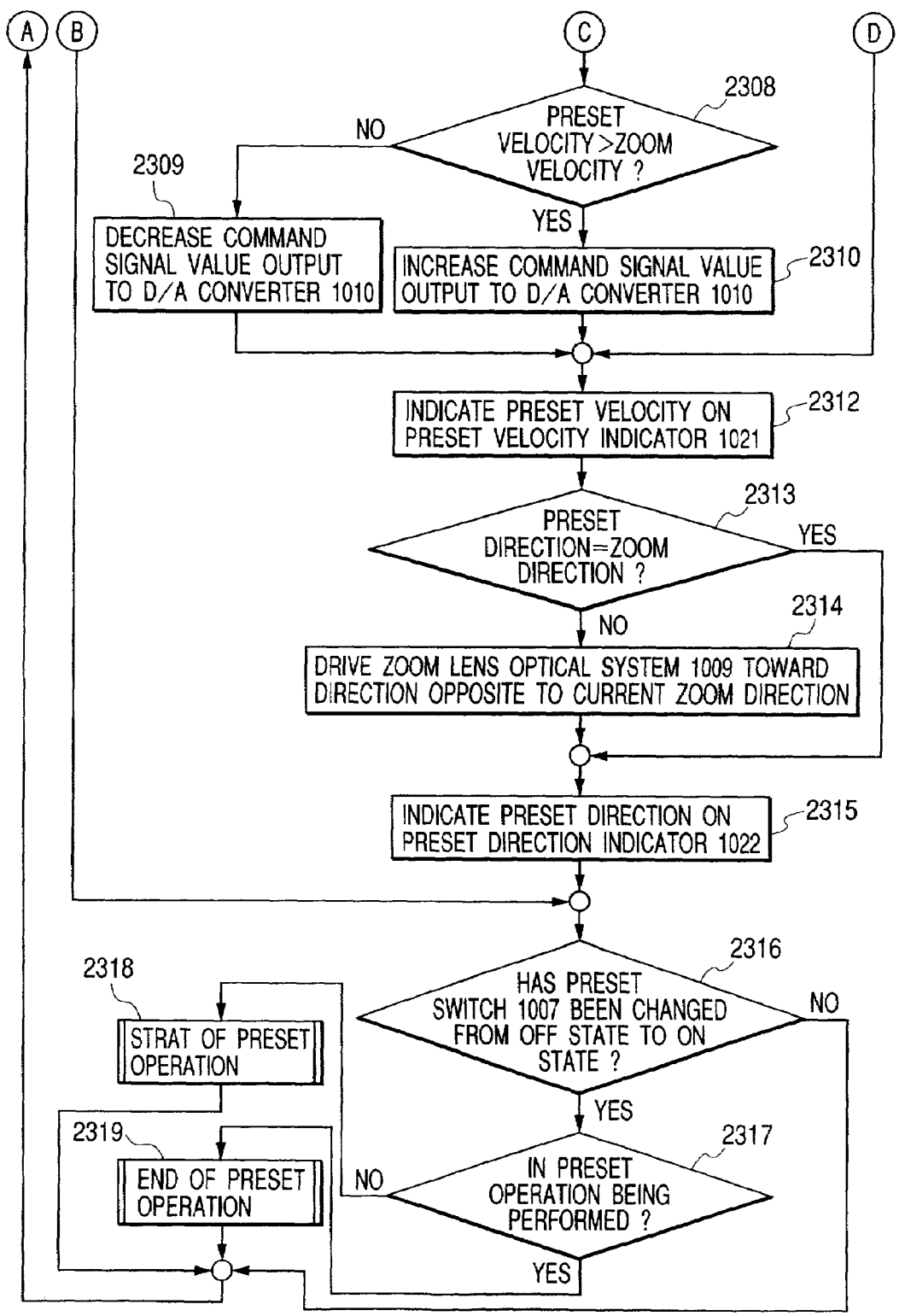
FIG. 18 is comprised of FIGS. 18A and 18B showing flow charts illustrating preset drive control in the lens device (also a flow chart according to the 10th embodiment of the present invention)

More specifically, the polarity of a preset value is changed, and the polarity-changed preset value is updated and stored in a memory unit 1025 in step 2302 in the flow chart of FIGS. 18A and 18B also showing the 10th embodiment.

The preset value is stored and held in the memory unit 1025 every time the direction is changed during preset drive control operation. The finally direction-changed preset value is also stored and held in the memory unit 1025, and can be used as a preset value at the start of the next preset drive control operation after the end of the current preset drive control operation. If the memory unit 1025 is realized by a memory such as an EEPROM which holds the memory contents even after power-off operation, the finally direction-changed preset value can be used as a preset value at the start of preset drive control operation from the next power-on operation.

(11th Embodiment)

In the ninth embodiment, the preset direction is changed by arranging the preset direction change switch 1020, i.e., an operation means dedicated to changing the preset direction. Alternatively, the preset direction may be changed by using a zoom switch 1001 for outputting a driving command signal for a zoom lens optical system 1009 in an operation other than preset drive control operation. This enables changing the preset direction without any new operation means, and can suppress an increase in the size of the lens device (driving unit).

Figure 19:
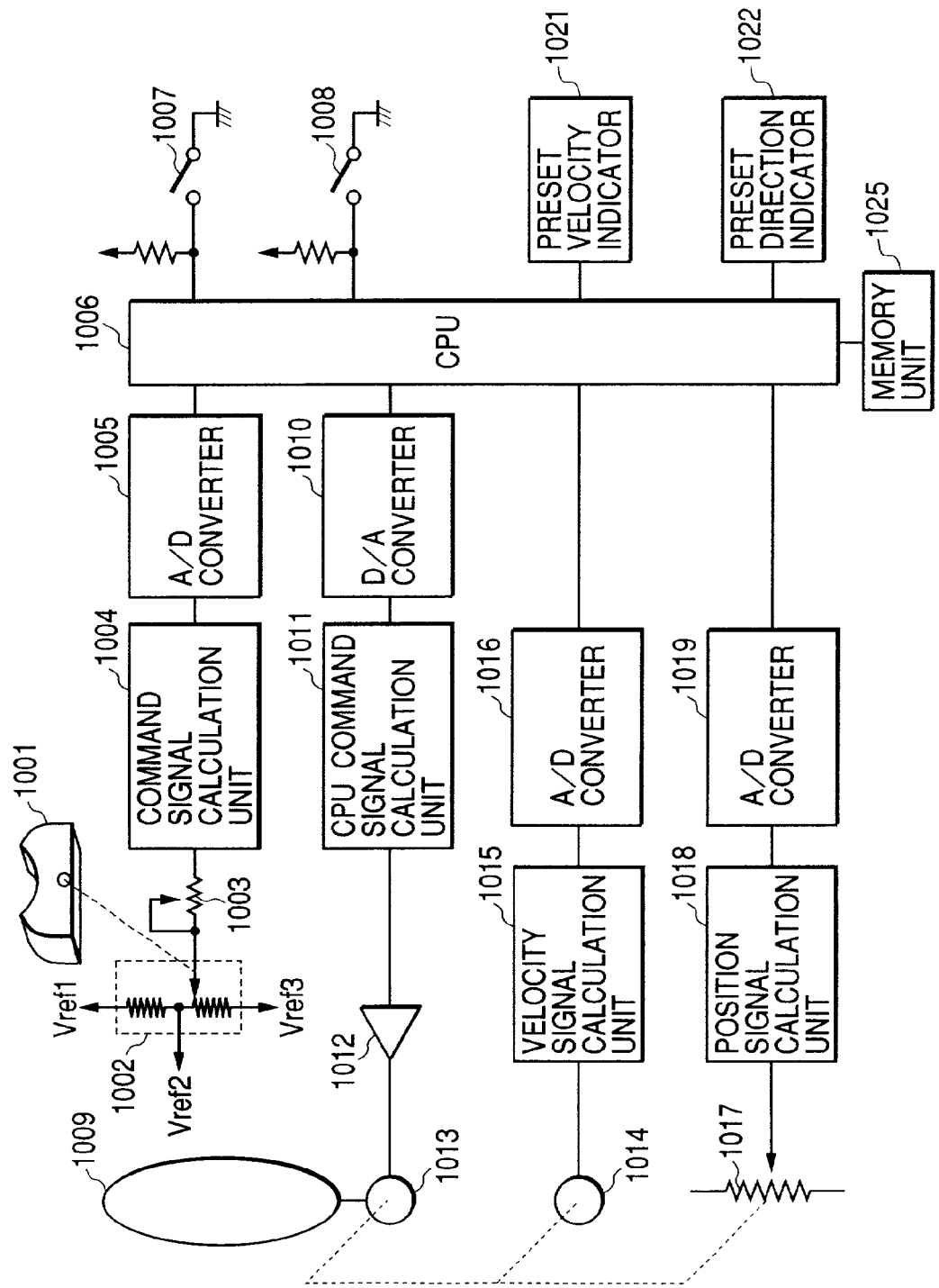
FIG. 19 is a block diagram showing the arrangement of a lens device according to the 11th embodiment of the present invention.

FIG. 19 shows the arrangement of a lens device according to the 11th embodiment. The lens device of the 11th embodiment is constituted by eliminating the preset direction change switch 1020 from the lens device of the ninth embodiment. The same reference numerals as in the ninth embodiment denote the same parts. General zoom driving corresponding to the operation of the zoom switch 1001, and storage/setting of the preset velocity and preset direction by the operation of a memory switch 1008 are the same as those in the ninth embodiment.

Also in the 11th embodiment, similar to the ninth embodiment, preset drive control operation starts when a CPU command signal (CPU command signal corresponding to the preset value "B") output from a CPU 1006 upon the first ON operation of a preset switch 1007 is input to a power amplifier 1012 via a D/A converter 1010 and CPU command signal calculation unit 1011. After the start of preset drive control operation, driving of the zoom lens optical system 1009 at a pre-stored preset velocity toward a pre-stored preset direction continues until the zoom lens optical system 1009 reaches the end of its movable range in the lens device or the preset switch 1007 is turned on again during driving. In the 11th embodiment, the preset direction can be changed by operating the zoom switch 1001 during preset drive control operation.

Figure 20B:
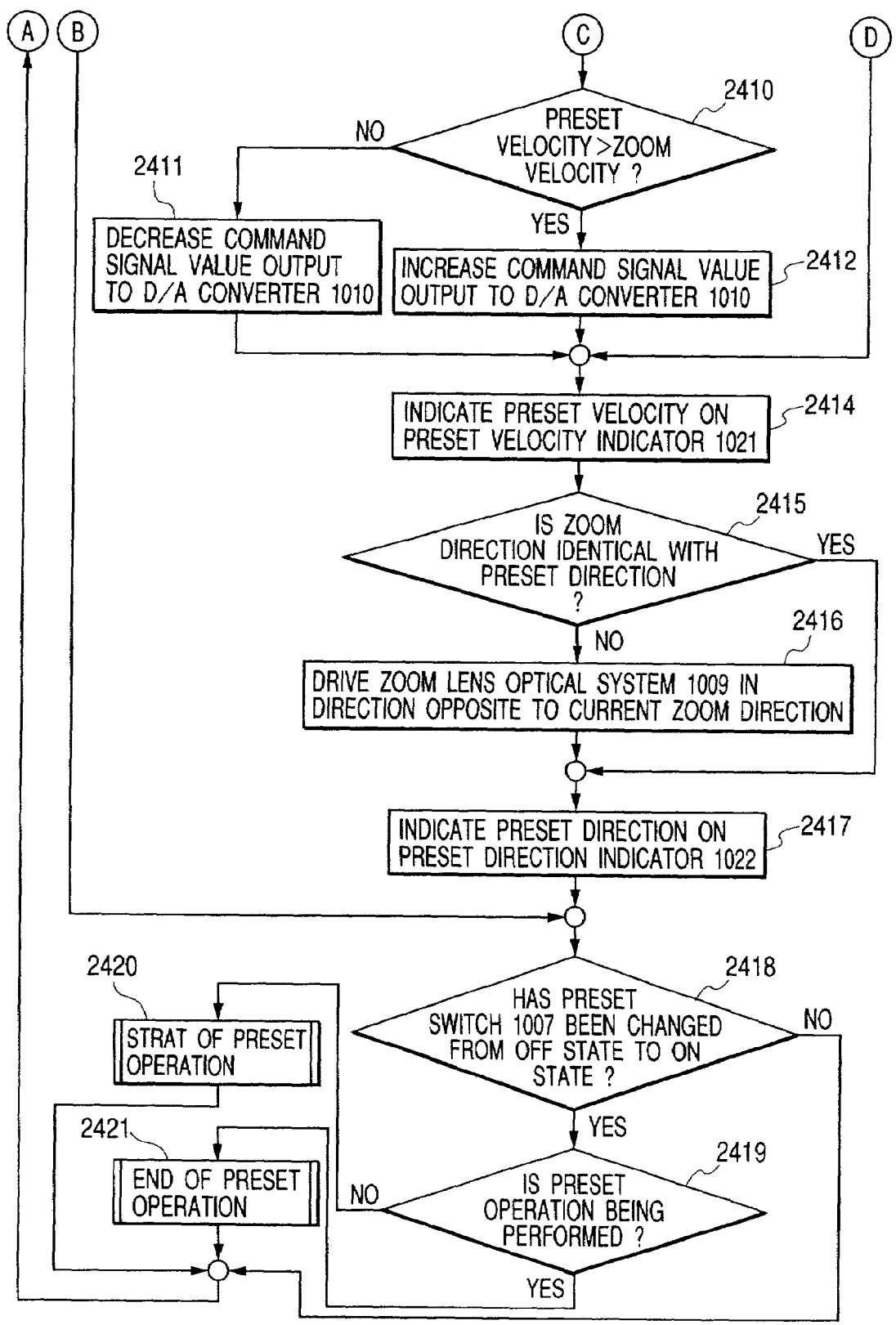
FIG. 20 is comprised of FIGS. 20A and 20B showing flow charts illustrating preset drive control in the lens device according to the 11th embodiment (also a flow chart according to the 12th embodiment of the present invention)

FIGS. 20A and 20B are flow charts showing preset drive control in the lens device of the 11th embodiment. The CPU 1006 checks whether preset drive control operation is being performed (step 2401). If No in step 2401, the CPU 1006 advances to step 2418. In step 2418, the CPU 1006 determines whether the preset switch 1007 has been changed from the OFF state to the ON state. If No in step 2481, the CPU 1006 returns to step 2401; or if Yes, determines whether preset drive control operation is being performed (step 2419). If No in step 2419, preset drive control operation starts (step 2420).

After the start of preset drive control operation, if the CPU 1006 determines in step 2401 that preset drive control operation is being performed, it obtains a zoom switch command signal from an A/D converter 1005, and checks based on the obtained zoom switch command signal whether the zoom switch 1001 is being operated (step 2403). If No in step 2403, the CPU 1006 advances to step 2406 and obtains the current zoom velocity and zoom direction from an A/D converter 1016. In step 2407, the CPU 1006 obtains the current position (to be referred to as a zoom position hereinafter) of the zoom lens optical system 1009 from an A/D converter 1019.

The CPU 1006 determines whether the zoom position obtained in step 2407 is on the end of the movable range of the lens device (step 2408). If Yes in step 2408, the CPU 1006 ends preset drive control operation (step 2413).

If No in step 2408, the CPU 1006 determines whether the zoom velocity obtained in step 2406 is the velocity corresponding to the preset value "B" set in the flow chart of FIG. 17 (step 2409).

If No in step 2409, the CPU 1006 determines whether the velocity corresponding to the preset value "B" is higher than the zoom velocity (step 2410). If the zoom velocity is lower (Yes in step 2410), the CPU 1006 increases the CPU command signal value output to the D/A converter 1010, and increases the zoom velocity to the velocity corresponding to the preset value "B" (step 2412). If the zoom velocity is higher than the velocity corresponding to the preset value "B", the CPU 1006 decreases the CPU command signal value output to the D/A converter 1010, and decreases the zoom velocity to the velocity corresponding to the preset value "B" (step 2411). Then, the CPU 1006 indicates the preset velocity on a preset velocity indicator 1021 (step 2414).

The CPU 1006 determines whether the zoom direction obtained in step 2406 is identical with the preset direction represented by the preset value "B" (step 2415). If No in step 2415, the CPU 1006 drives the zoom lens optical system

1009 toward a direction opposite to the current zoom direction (step 2416), and advances to step 2417. If Yes in step 2415, the CPU 1006 directly advances to step 2417. In step 2417, the CPU 1006 indicates the preset direction on a preset direction indicator 1022.

In step 2418, the CPU 1006 determines whether the preset switch 1007 has been changed from the OFF state to the ON state. If No in step 2418, the CPU 1006 repeats steps 2401 to 2417 again. At this time, if the CPU 1006 determines in step 2403 that the zoom switch 1001 is being operated, the CPU 1006 shifts to step 2404 and checks whether the state (operation direction) of the zoom switch 1001 is identical with the preset direction. If Yes in step 2404, the CPU 1006 directly shifts to step 2406; or if No, shifts to step 2405 and reverses the polarity of the preset value "B".

Thus, the zoom direction obtained in step 2406 becomes different from the preset direction (No in step 2415), and the driving direction of the zoom lens optical system 1009 is reversed (step 2416). Since the preset value "B" does not change, the driving velocity of the zoom lens optical system 1009 does not change.

In the 11th embodiment, when the zoom switch 1001 is operated in an operation other than preset drive control, the zoom lens optical system 1009 is driven in accordance with both the driving direction and driving velocity designated by the zoom switch command signal. When the zoom switch 1001 is operated in preset drive control operation, whether to drive the zoom lens optical system 1009 in the current direction or opposite direction is determined using only the driving direction from the zoom switch command signal.

Preset drive control operation continues after the preset direction and the actual driving direction of the zoom lens optical system 1009 are reversed in the above manner. If the CPU 1006 determines in step 2418 that the preset switch 1007 has been changed from the OFF state to the ON state and determines in step 2419 that preset drive control operation is being performed, the CPU 1006 ends preset drive control operation (step 2421).

As described above, according to the 11th embodiment, the preset direction can be changed (preset velocity is maintained) and the driving direction of the zoom lens optical system 1009 can be reversed by operating the zoom switch 1001 in preset drive control operation. The indicators 1021 and 1022 for indicating a preset direction and preset velocity allow the user to visually recognize them. This is useful especially in zoom driving at a low velocity (constant velocity), like preset drive control of the 11th embodiment.

In the 11th embodiment, the currently set preset direction (changed preset direction) is indicated on the preset direction indicator 1022. Alternatively, the original preset direction may be indicated regardless of whether the preset direction has been changed, in order to prevent the user from losing the original preset direction after the preset direction is changed.

In the 11th embodiment, the preset velocity during preset drive control operation is indicated on the preset velocity indicator 1021. Alternatively, the actual driving velocity of the zoom lens optical system 1009 at that time may be indicated on the preset velocity indicator 1021.

In the 11th embodiment, a preset direction as a target zoom driving direction is stored in advance as preset direction designation information, and the zoom lens optical system 1009 is driven toward the direction corresponding to the preset direction. The present invention can also be applied to a case wherein a preset position as a target zoom position is stored in advance as preset direction designation information, and the zoom lens optical system 1009 is driven toward the direction corresponding to the preset position. In this case, for example, if the zoom lens optical system 1009 is driven toward the direction corresponding to the preset position, and the zoom switch 1001 is operated in the opposite direction, the preset position is changed to an end (telephoto end or wide-angle end) of the movable range opposite to the current driving direction.

In the 11th embodiment, the preset direction is changed using the zoom switch 1001. Alternatively, the preset direction may be changed using the thumb ring of a zoom demand capable of performing zoom operation by remote control, in place of the zoom switch 1001.

(12th Embodiment)

In the 11th embodiment, a preset value is stored in the memory unit 1025 only when the user turns on the memory switch 1008 from the OFF state before the start of preset drive control, and a changed preset value is deleted at the end of preset drive control (only the original preset value is stored and held in the memory unit 1025). Alternatively, a preset value changed in polarity (direction) in accordance with the operation of the preset direction change switch 1020 during preset drive control operation may be stored and held in the memory unit 1025.

More specifically, the polarity of a preset value is changed, and the polarity-changed preset value is updated and stored in a memory unit 1025 in step 2405 in the flow chart of FIGS. 20A and 20B also showing the 12th embodiment.

The preset value is stored and held in the memory unit 1025 every time the direction is changed during preset drive control operation. The finally direction-changed preset value is also stored and held in the memory unit 1025, and can be used as a preset value at the start of the next preset drive control operation after the end of the current preset drive control operation. If the memory unit 1025 is realized by a memory such as an EEPROM which holds the memory contents even after power-off operation, the finally direction-changed preset value can be used as a preset value at the start of preset drive control operation from the next power-on operation.

(13th Embodiment)

In the 11th embodiment, the preset direction is changed using the zoom switch 1001 as an operation means for changing the preset direction. Alternatively, a preset switch 1007 operated to designate the start of preset drive control operation may be used as an operation means for changing the preset direction. The preset switch 1007 is originally operated to designate the end of preset drive control operation. In the 13th embodiment, preset drive control operation is ended by operating a zoom switch 1001 during preset drive control operation. This enables changing the preset direction without any new operation means, and can suppress an increase in the size of the lens device (driving unit).

The lens device of the 13th embodiment is constituted by eliminating the preset direction change switch 1020 from the lens device of the ninth embodiment. The same reference numerals as in the ninth embodiment denote the same parts. General zoom driving corresponding to the operation of the zoom switch 1001, and storage/setting of the preset velocity and preset direction by the operation of a memory switch 1008 are the same as those in the ninth embodiment.

Also in the 13th embodiment, similar to the ninth embodiment, preset drive control operation starts when a CPU command signal (CPU command signal corresponding to the preset value "B") output from a CPU 1006 upon the first ON operation of the preset switch 1007 is input to a power amplifier 1012 via a D/A converter 1010 and CPU command signal calculation unit 1011. After the start of preset drive control operation, driving of a zoom lens optical system 1009 at a pre-stored preset velocity toward a pre-stored preset direction continues until the zoom lens optical system 1009 reaches the end of its movable range in the lens device or the preset switch 1007 is turned on again during driving. In the 13th embodiment, the preset direction can be changed by operating the preset switch 1007 during preset drive control operation.

Figure 21B:
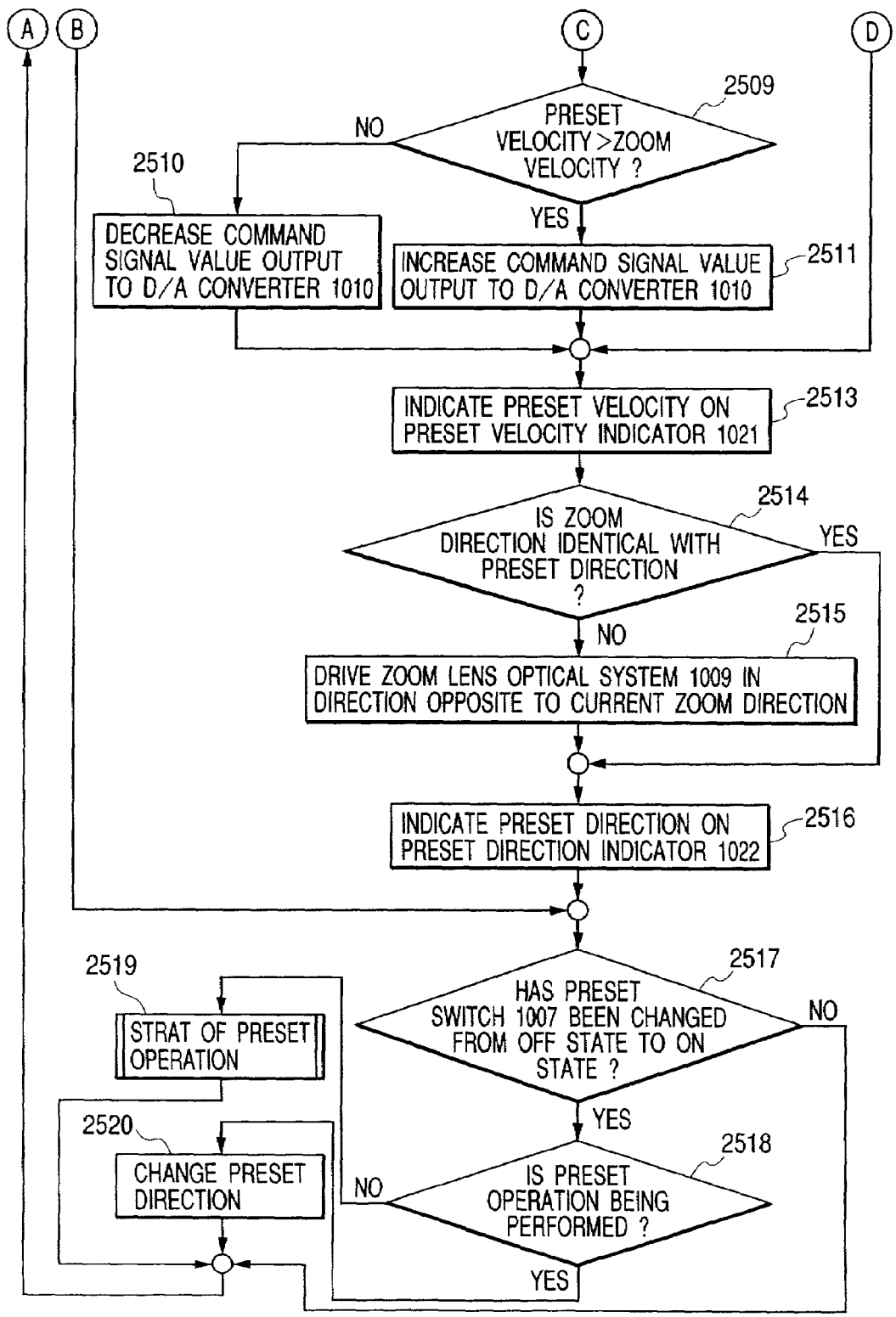
FIG. 21 is comprised of FIGS. 21A and 21B showing flow charts illustrating preset drive control in a lens device according to the 13th embodiment of the present invention (also a flow chart according to the 14th embodiment of the present invention).

FIGS. 21A and 21B are flow charts showing preset drive control in the lens device of the 13th embodiment. The CPU 1006 checks whether preset drive control operation is being performed (step 2501). If No in step 2501, the CPU 1006 advances to step 2517. In step 2517, the CPU 1006 determines whether the preset switch 1007 has been changed from the OFF state to the ON state. If No in step 2517, the CPU 1006 returns to step 2501; or if Yes, determines whether preset drive control operation is being performed (step 2518). If No in step 2518, preset drive control operation starts (step 2519).

After the start of preset drive control operation, if the CPU 1006 determines in step 2501 that preset drive control operation is being performed, it obtains a zoom switch command signal from an A/D converter 1005, and checks based on the obtained zoom switch command signal whether the zoom switch 1001 is being operated (step 2503). If No in step 2503, the CPU 1006 advances to step 2505 and obtains the current zoom velocity and zoom direction from an A/D converter 1016. In step 2506, the CPU 1006 obtains the current position (to be referred to as a zoom position hereinafter) of the zoom lens optical system 1009 from an A/D converter 1019.

The CPU 1006 determines whether the zoom position obtained in step 2506 is on the end of the movable range of the lens device (step 2507). If Yes in step 2507, the CPU 1006 ends preset drive control operation (step 2512).

If No in step 2507, the CPU 1006 determines whether the zoom velocity obtained in step 2505 is the velocity corresponding to the preset value "B" set in the flow chart of FIG. 17 (step 2508).

If No in step 2508, the CPU 1006 determines whether the velocity corresponding to the preset value "B" is higher than the zoom velocity (step 2509). If the zoom velocity is lower (Yes in step 2509), the CPU 1006 increases the CPU command signal value output to the D/A converter 1010, and increases the zoom velocity to the velocity corresponding to the preset value "B" (step 2511). If the zoom velocity is higher than the velocity corresponding to the preset value "B" (No in step 2509), the CPU 1006 decreases the CPU command signal value output to the D/A converter 1010, and decreases the zoom velocity to the velocity corresponding to the preset value "B" (step 2510). The CPU 1006 indicates the preset velocity on a preset velocity indicator 1021 (step 2513).

The CPU 1006 determines whether the zoom direction obtained in step 2505 is identical with the preset direction represented by the preset value "B" (step 2514). If No in step 2514, the CPU 1006 drives the zoom lens optical system 1009 toward a direction opposite to the current zoom direction (step 2515), and advances to step 2516. If Yes in step 2514, the CPU 1006 directly advances to step 2516. In step 2516, the CPU 1006 indicates the preset direction on a preset direction indicator 1022.

In step 2517, the CPU 1006 determines whether the preset switch 1007 has been changed from the OFF state to the ON state. If No in step 2517, the CPU 1006 repeats steps 2501 to 2516 again; or if Yes, shifts to step 2520 and reverses the polarity of the preset value "B".

Accordingly, the zoom direction obtained in step 2505 becomes different from the preset direction (No in step 2514), and the driving direction of the zoom lens optical system 1009 is reversed (step 2515). Since the preset value "B" does not change, the driving velocity of the zoom lens optical system 1009 does not change.

Preset drive control operation continues after the preset direction and the actual driving direction of the zoom lens optical system 1009 are reversed in the above manner. If the CPU 1006 determines in step 2503 that the zoom switch 1001 is being operated, the CPU 1006 advances to step 2504 and ends preset drive control operation.

As described above, according to the 13th embodiment, the preset direction can be changed (preset velocity is maintained) and the driving direction of the zoom lens optical system 1009 can be reversed by operating the preset switch 1007 in preset drive control operation. The indicators 1021 and 1022 for indicating a preset direction and preset velocity allow the user to visually recognize them. This is useful especially in zoom driving at a low velocity (constant velocity), like preset drive control of the 13th embodiment.

In the 13th embodiment, the currently set preset direction (changed preset direction) is indicated on the preset direction indicator 1022. Alternatively, the original preset direction may be indicated regardless of whether the preset direction has been changed, in order to prevent the user from losing the original preset direction after the preset direction is changed.

In the 13th embodiment, the preset velocity during preset drive control operation is indicated on the preset velocity indicator 1021. Alternatively, the actual driving velocity of the zoom lens optical system 1009 at that time may be indicated on the preset velocity indicator 1021.

In the 13th embodiment, a preset direction as a target zoom driving direction is stored in advance as preset direction designation information, and the zoom lens optical system 1009 is driven toward the direction corresponding to the preset direction. The present invention can also be applied to a case wherein a preset position as a target zoom position is stored in advance as preset direction designation information, and the zoom lens optical system 1009 is driven toward the direction corresponding to the preset position. In this case, for example, if the preset switch 1007 is operated while the zoom lens optical system 1009 is driven toward the direction corresponding to the preset position, the preset position is changed to an end (telephoto end or wide-angle end) of the movable range opposite to the current driving direction.

(14th Embodiment)

In the 13th embodiment, a preset value is stored in the memory unit 1025 only when the user turns on the memory switch 1008 from the OFF state before the start of preset drive control, and a changed preset value is deleted at the end of preset drive control (only the original preset value is stored and held in the memory unit 1025). Alternatively, a preset value changed in polarity (direction) in accordance with the operation of the preset switch 1007 during preset drive control operation may be stored and held in the memory unit 1025.

More specifically, the polarity of a preset value is changed, and the polarity-changed preset value is updated and stored in a memory unit 1025 in step 2520 in the flow chart of FIGS. 21A and 21B also showing the 14th embodiment.

The preset value is stored and held in the memory unit 1025 every time the direction is changed during preset drive control operation. The finally direction-changed preset value is also stored and held in the memory unit 1025, and can be used as a preset value at the start of the next preset drive control operation after the end of the current preset drive control operation. If the memory unit 1025 is realized by a memory such as an EEPROM which holds the memory contents even after power-off operation, the finally direction-changed preset value can be used as a preset value at the start of preset drive control operation from the next power-on operation.

In the 14th embodiment, both the preset direction and preset velocity are stored in advance, and the zoom lens optical system is driven toward the stored preset direction at the stored preset velocity in preset drive control. The present invention can also be applied to a case wherein only the preset direction is stored and the zoom lens optical system is driven toward the preset direction at a predetermined or arbitrary velocity.

The first to eighth embodiments have exemplified a lens device constituted by mounting the driving unit 200 on the lens device main body 100 shown in FIG. 2. The ninth to 14th embodiments have exemplified a lens device constituted by mounting the driving unit 1200 on the lens device main body 1100 shown in FIG. 15. The present invention can also be applied to a lens device for a camera system constructed by storing an optical adjustment means including the zoom lens optical system and a driving/control system in one housing and mounting them as an integral member on a camera.

In the first to 14th embodiments, preset drive control is done for the zoom lens optical system 9 or 1009. The present invention can also be applied to an optical adjustment means (e.g., a focus lens system or a light quantity adjustment system such as an iris) other than the zoom lens optical system 9 or 1009.

As has been described above, according to the present invention, preset velocity information which determines the driving velocity of an optical adjustment means in preset drive control is changed and set in accordance with the operation of a predetermined operation means during preset drive control. The present invention can implement an optical device in which the predetermined operation means can only be operated to increase/decrease the driving velocity of the optical adjustment means while continuing preset drive control.

According to the present invention, preset direction designation information (direction information or position information) which determines the driving direction of the optical adjustment means in preset drive control is changed and set in accordance with the operation of the predetermined operation means during preset drive control. By only operating the predetermined operation means, the driving direction of the optical adjustment means can be changed while preset drive control is kept performed.

A more convenient direction/velocity preset function can be implemented by applying the present invention to, e.g., an optical device in which preset velocity information as the target driving velocity of the optical adjustment means can be stored together with preset direction designation information, and preset drive control operation is done toward the driving direction corresponding to the preset direction designation information at the driving velocity corresponding to the preset velocity information.

Further, the optical device can be equipped with an indication means for indicating the driving direction (preset direction) of the optical adjustment means corresponding to preset direction designation information or the driving velocity (preset velocity) of the optical adjustment means corresponding to preset velocity information. The indication means allows the user to visually confirm a preset direction or preset velocity, and is a useful function particularly in preset drive control of the optical adjustment means at a low velocity (constant velocity).

What is claimed is:

1. An optical device comprising:
   a variator lens;
   a memory for storing preset speed information to drive the variator lens;
   driving means for driving the variator lens;
   a zoom switch configured to be operated to determine a driving direction and driving speed and to instruct driving of the variator lens;
   a storage switch configured to be operated to store a driving speed of the variator lens as the preset speed information;
   a preset switch; and
   a controller for controlling the driving means to drive the variator lens at a speed related to the preset speed information stored in the memory, in response to the operation of the preset switch.
   wherein the controller changes the preset speed information on the basis of the stored preset speed information, in accordance with an operation of the zoom switch while the variator lens is being driven at the speed related to the preset speed information.

2. A device according to claim 1, wherein the controller sets a change amount of the preset speed information in accordance with an operation amount of the zoom switch.

3. A device according to claim 1, wherein every time the zoom switch is operated, the controller sets a change amount of the preset speed information regardless of an operation amount.

4. A device according to claim 1, wherein
   the memory stores preset position information,
   the driving means drives the variator lens in two directions (backward and forward directions, right and left directions, or up and down directions),
   the zoom switch has two operation directions corresponding to the two driving directions of the variator lens,
   the controller performs the preset drive control of the driving means to drive the variator lens on the basis of the preset speed information and the preset position information, and
   the controller changes the preset speed information to a high-velocity side when the zoom switch is operated in one of the two operation directions, and to a low-velocity side when the zoom switch is operated in the other one of the two operation directions.

5. A device according to claim 1, wherein
   the memory stores preset position information,
   the driving means drives the variator lens in two directions (backward and forward directions, right and left directions, or up and down directions),
   the zoom switch has two operation directions corresponding to the two driving directions of the variator lens,
   the controller performs the preset drive control of the driving means to drive the variator lens on the basis of the preset speed information and the preset position information, and
   the controller changes the preset speed information to a high-velocity side when the zoom switch is operated in a direction of the two operation directions that corresponds to a current driving direction of the variator lens, and to a low-velocity side when the zoom switch is operated in a direction of the two operation directions that corresponds to a direction opposite to the current driving direction of the variator lens.

6. A device according to claim 1, wherein the controller stores and holds, in the memory, the information of the speed of the variator lens at an end of the preset drive control, and sets the preset speed information as preset speed information at a start of a next preset drive control.

7. A device according to claim 1, wherein
the memory stores preset position information,
the controller performs the preset drive control of the driving means to drive the variator lens on the basis of the preset speed information and the preset position information, and
the controller stores and holds, in the memory, preset speed information and preset position information at an end of the preset drive control, and sets the preset speed information and the preset position information as preset speed information and preset position information at a start of a next preset drive control.

8. A device according to claim 1, wherein the device further comprises preset driving start operation means configured to be operated to start the preset driving.

9. A camera system comprising the optical device of claim 1.

* * * * *

UNITED STATES PATENT AND TRADEMARK OFFICE
CERTIFICATE OF CORRECTION

PATENT NO. : 7,158,179 B2
APPLICATION NO. : 09/819757
DATED : January 2, 2007
INVENTOR(S) : Kazumasa Yoshikawa et al.

It is certified that error appears in the above-identified patent and that said Letters Patent is hereby corrected as shown below:

IN THE DRAWINGS:
Sheet No. 11, Figure 10, Item 802, "TELEPHOTE" should read --TELEPHOTO--.
Sheet No. 12, Figure 11, Item 852, "TELEPHOTE" should read --TELEPHOTO--.
Sheet No. 19, Figure 18A, Item 2306, "IN" should read --IS--.
Sheet No. 20, Figure 18B, Item 2318, "STRAT" should read --START---, and Item 2317, "IN" should read --IS--.
Sheet No. 23, Figure 20B, Item 2420, "STRAT" should read --START--.
Sheet No. 25, Figure 21B, Item 2519, "STRAT" should read --START--.

COLUMN 7:
Line 10, "correspond" should read --corresponds--.

COLUMN 20:
Line 9, "—" should read --+--.

COLUMN 22:
Line 14, "—" should read --+--.

COLUMN 34:
Line 17, "switch." should read --switch,--.

Signed and Sealed this

Twenty-third Day of October, 2007

JON W. DUDAS
*Director of the United States Patent and Trademark Office*